United States Patent
Segev et al.

(10) Patent No.: US 12,457,586 B2
(45) Date of Patent: Oct. 28, 2025

(54) METHODS AND ARRANGEMENTS FOR RESOURCE ASSESSMENT

(71) Applicant: Intel Corporation, Santa Clara, CA (US)

(72) Inventors: Yonathan Segev, Sunnyvale, CA (US); Carlos Cordeiro, Portland, OR (US); David Birnbaum, Modiin (IL); Qinghua Li, San Ramon, CA (US); Xiaogang Chen, Portland, OR (US); Hassan Yaghoobi, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 702 days.

(21) Appl. No.: 17/561,905

(22) Filed: Dec. 24, 2021

(65) Prior Publication Data

US 2022/0124684 A1    Apr. 21, 2022

(51) Int. Cl.
*H04W 72/04* (2023.01)
*H04L 67/104* (2022.01)
*H04W 72/40* (2023.01)

(52) U.S. Cl.
CPC ........... *H04W 72/04* (2013.01); *H04L 67/104* (2013.01); *H04W 72/40* (2023.01)

(58) Field of Classification Search
CPC ....... H04W 72/00; H04W 72/04; H04W 4/70; H04W 28/00; H04W 28/0287;
(Continued)

(56) References Cited

U.S. PATENT DOCUMENTS

| 8,891,497 B1 * | 11/2014 | Vleugels | ........... H04W 52/0274 370/464 |
| 2007/0105576 A1 * | 5/2007 | Gupta | ................. H04W 52/243 455/39 |

(Continued)

FOREIGN PATENT DOCUMENTS

WO    2021215753 A1    10/2021

OTHER PUBLICATIONS

Extended European Search Report for related European Application No. 22200019.2, dated Apr. 17, 2023, 11 pages.
(Continued)

*Primary Examiner* — Warner Wong
(74) *Attorney, Agent, or Firm* — KDW FIRM PLLC

(57) ABSTRACT

Logic to generate, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA. Logic to cause transmission of the MAC resource assessment trigger frame to the first STA and the first group of STAs. And logic to receive one or more short term resource assessment frames from the first group of STAs, the one or more short term resource assessment frames each comprising an indication of resources for a data transfer.

25 Claims, 19 Drawing Sheets

(58) Field of Classification Search
CPC . H04W 28/0875; H04W 28/16; H04W 72/02; H04W 72/0453; H04W 72/20; H04W 72/25; H04W 72/40; H04W 72/50; H04L 67/04; H04L 67/10; H04L 2012/5631; H04L 47/478; H04L 47/70
See application file for complete search history.

(56) References Cited

U.S. PATENT DOCUMENTS

| | | | |
|---|---|---|---|
| 2016/0381688 A1* | 12/2016 | Hedayat | H04L 27/0006 370/329 |
| 2017/0223741 A1* | 8/2017 | Eitan | H04W 74/08 |
| 2021/0111855 A1* | 4/2021 | Verma | H04W 72/044 |
| 2023/0137826 A1* | 5/2023 | Ajami | H04L 5/0055 370/329 |
| 2023/0180314 A1* | 6/2023 | Kim | H04W 76/14 370/329 |
| 2025/0008558 A1* | 1/2025 | Wang | H04W 16/14 |

OTHER PUBLICATIONS

Stephane Baron (Canon) et al., "Direct Link MU transmissions," vol. 802.11 EHT; 802.11be, No. 2, Sep. 15, 2019, (Sep. 19, 2019), pp. 1-11, IEEE 11-19-1117-02-00BE.

Stephane Baron (Canon) et al., "Triggered-p2p-transmissions follow up," vol. 802.11 EHT; 802.11be, No. 7, Aug. 31, 2020, (Sep. 1, 2020), pp. 1-18, IEEE 11-20-0813-07-00BE.

\* cited by examiner

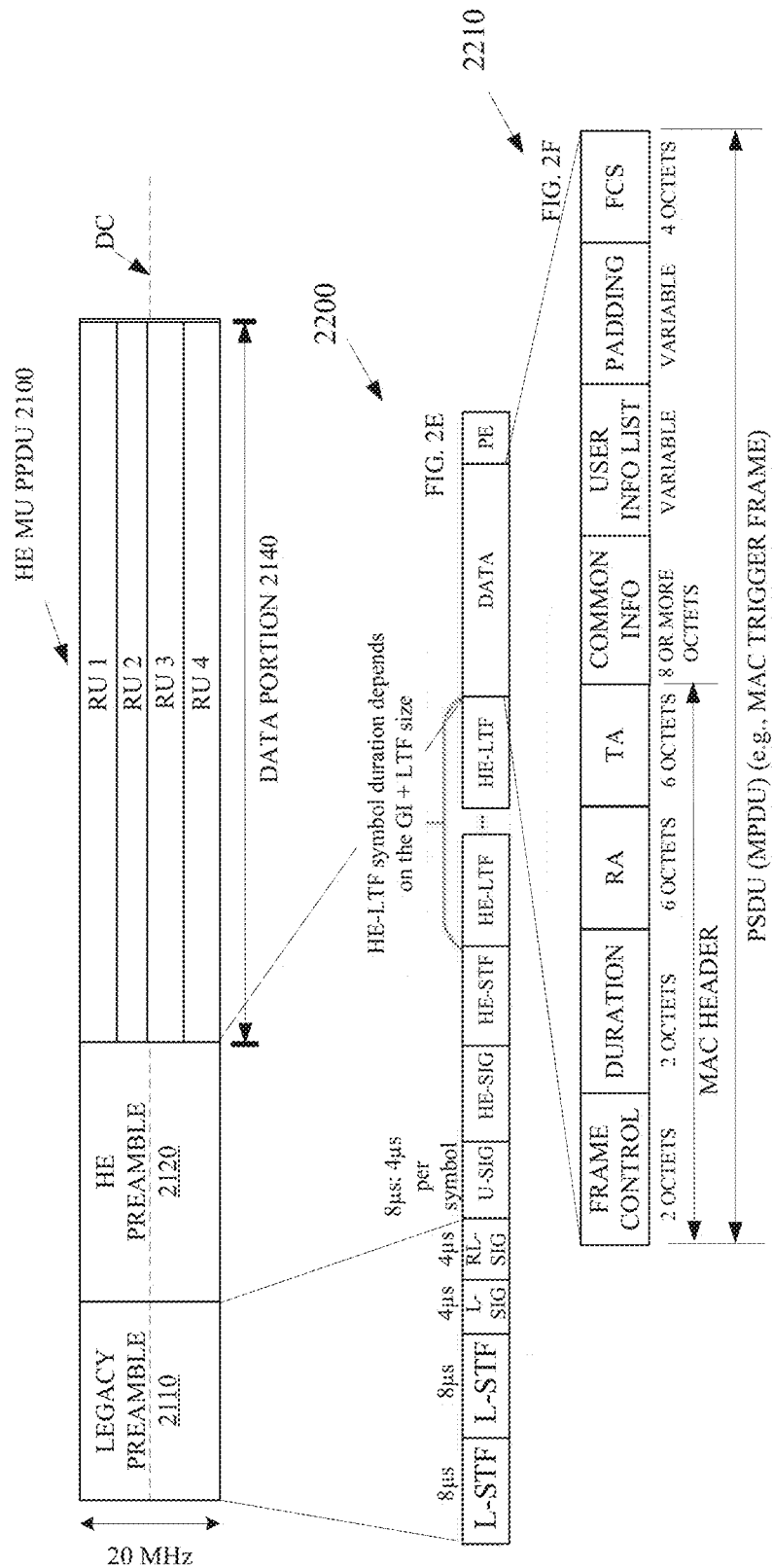

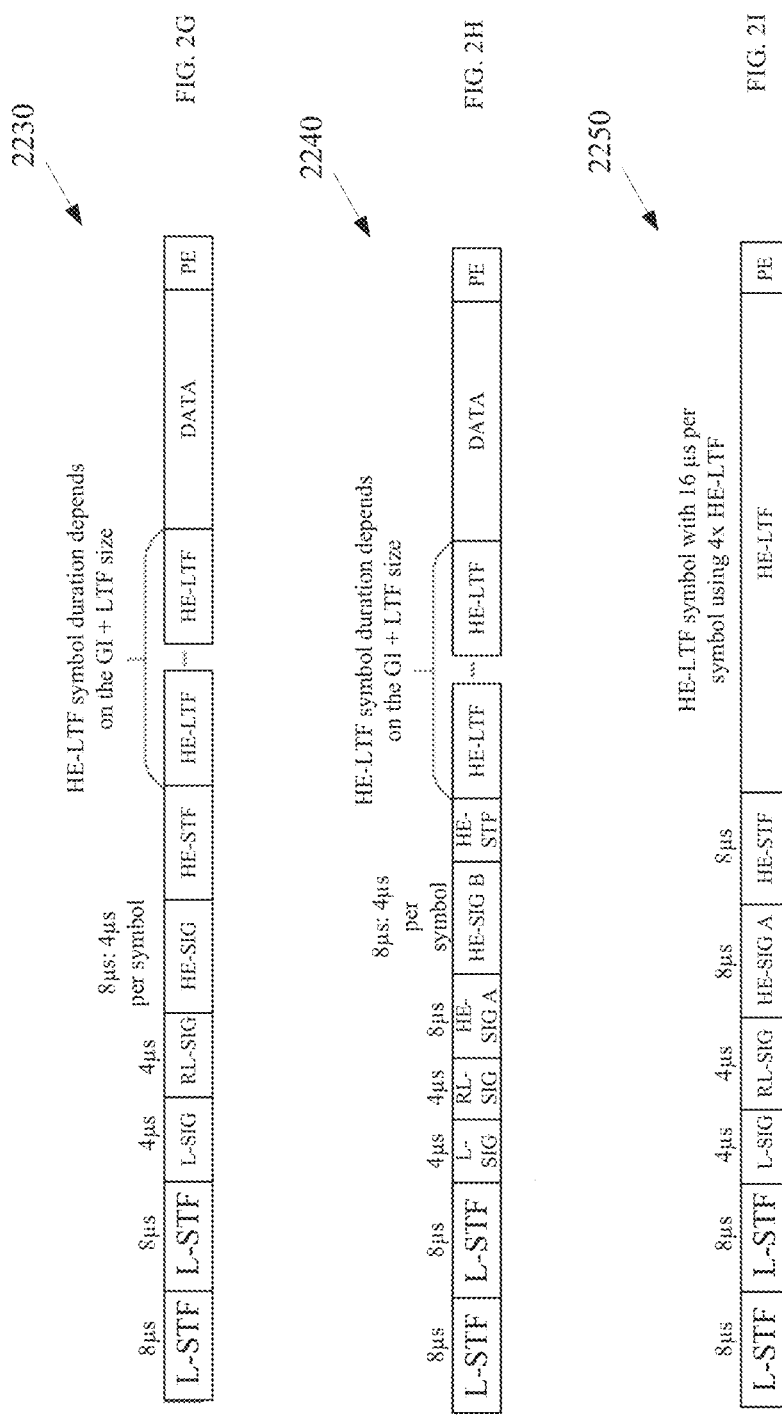

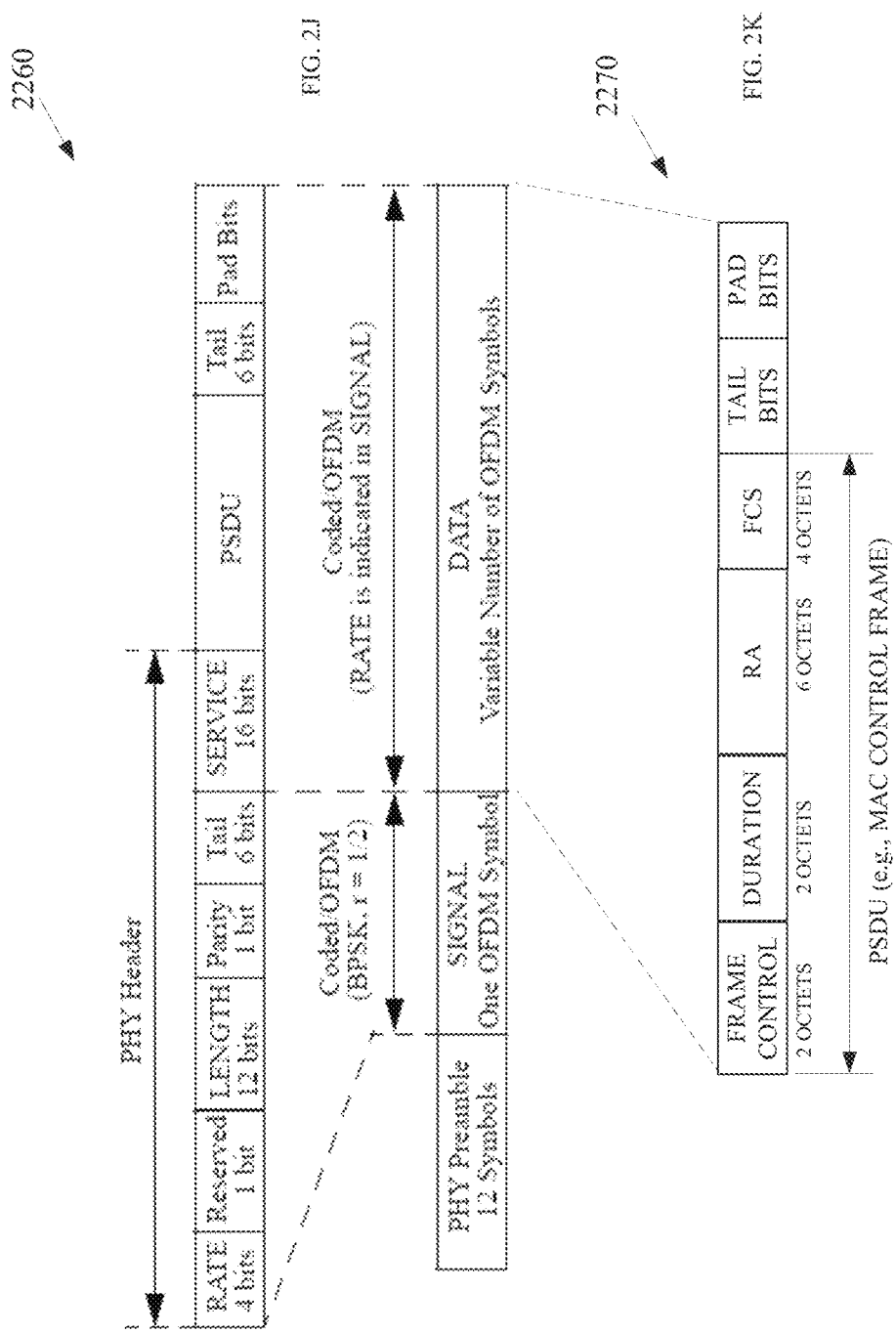

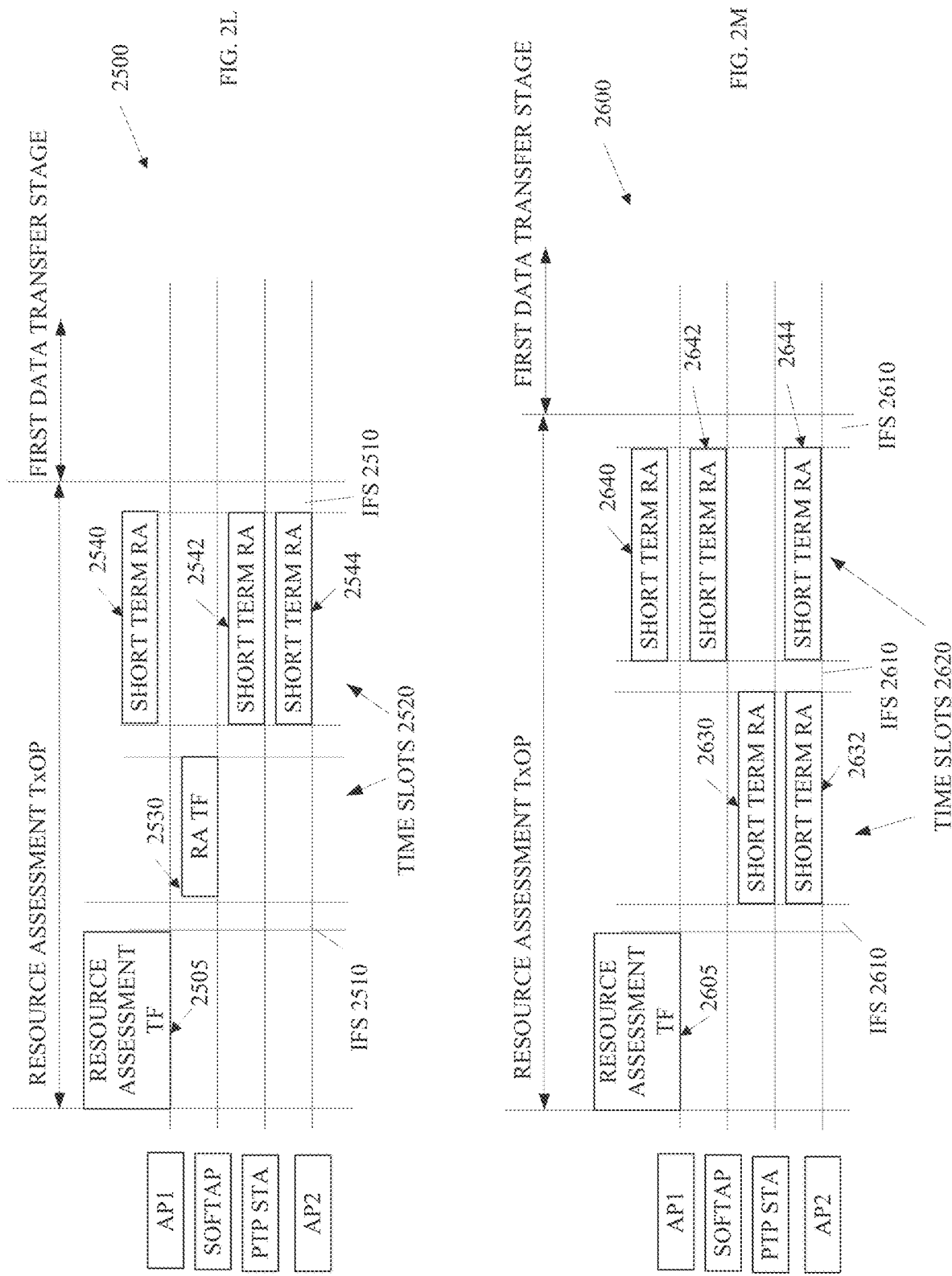

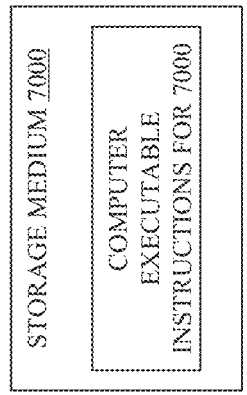
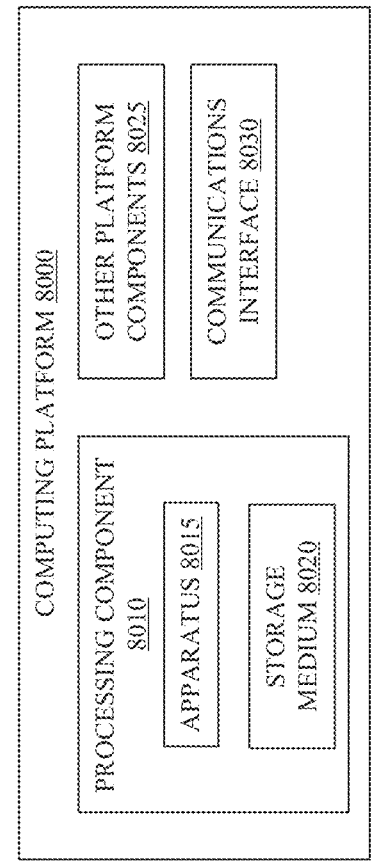

METHODS AND ARRANGEMENTS FOR RESOURCE ASSESSMENT

TECHNICAL FIELD

This disclosure generally relates to systems and methods for wireless communications and, more particularly, to implementing resource assessments to support peer-to-peer (P2P) communications.

BACKGROUND

The increase in interest in network and Internet connectivity drives design and production of new wireless products. The escalating numbers of wireless devices active as well as the bandwidth demands of the users of such devices are increasing bandwidth demands for access to wireless channels. The Institute of Electrical and Electronics Engineers (IEEE) is developing one or more new standards that utilize Orthogonal Frequency-Division Multiple Access (OFDMA) in channel allocation to increase bandwidth and data throughput capabilities of the devices such as access point stations and non-access point stations, to increase bandwidth and data throughput demands from users. These new standards may require operability with legacy devices and other concurrently developing communications standards.

BRIEF DESCRIPTION OF THE DRAWINGS

FIG. 2D depicts an embodiment of a multiple user (MU) trigger-based (TB) physical layer protocol data unit (PPDU) transmitted on an orthogonal frequency-division multiplexing (OFDM) modulated signal.

FIG. 2E depicts another embodiment of a MU TB PPDU.

FIG. 2F depicts an embodiment of a data field of a MU TB PPDU including a medium access control (MAC) trigger frame.

FIG. 2G depicts an embodiment of a short term resource indication frame such as the short term resource indication frame shown in FIG. 2L-M.

FIG. 2H depicts another embodiment of a short term resource indication frame such as the short term resource indication frame shown in FIG. 2L-M.

FIG. 2I depicts another embodiment of a short term resource indication frame such as the short term resource indication frame shown in FIG. 2L-M.

FIG. 2J depicts another embodiment of a short term resource indication frame with a MAC control frame such as the short term resource indication frames shown in FIGS. 2G and 2H.

FIG. 2K depicts the MAC control frame in the data portion of the short term resource indication frame shown in FIG. 2J.

FIG. 2L depicts an embodiment of a timing diagram to implement assessment logic circuitry.

FIG. 2M depicts another embodiment of a timing diagram to implement assessment logic circuitry.

FIGS. 7-8 depict embodiments of a computer-readable storage medium and a computing platform to implement assessment logic circuitry.

DETAILED DESCRIPTION OF EMBODIMENTS

Figure 1A:
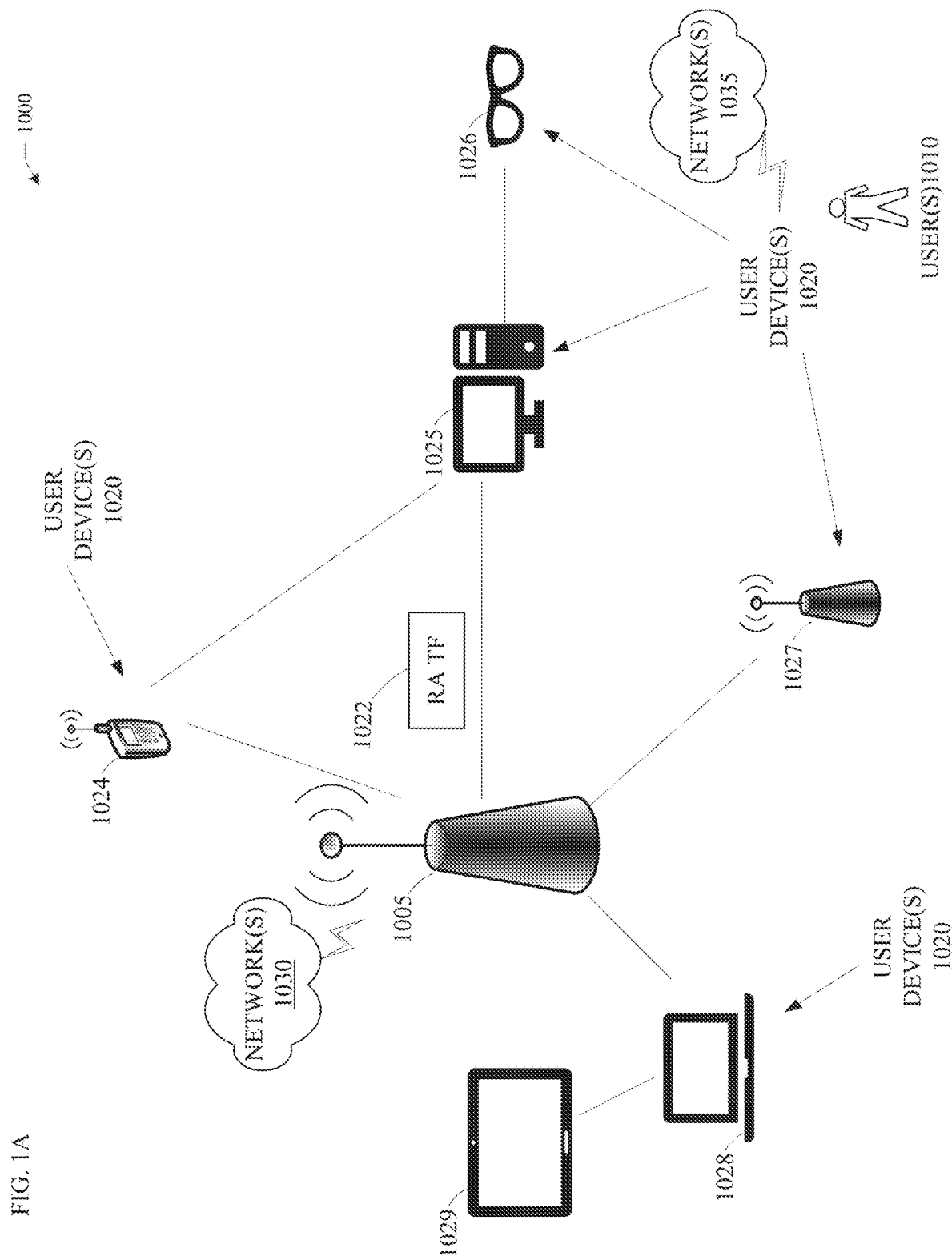
FIG. 1A depicts a system diagram illustrating an embodiment of a network environment for assessment logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In 2019 the FCC approved Low Power Indoor (LPI) operation in the 6 GHz band, which requires that all communication happens through an AP. To enable peer-to-peer (P2P) communications (also referred to as PTP communications), recently the FCC is considering a ruling that for the 6 GHz band it would suffice for a device to decode an enabling signal at least once every 4 sec in order to engage in P2P transmissions. An enabling signal is a signal generated by a channel enabler, i.e., a fixed device like an AP. This same type of operation is also being enabled in the EU and other countries.

While enabling signal operation is required for P2P stations (STAs) to use of a 6 GHz channel, an enabling signal operation can also be advantageous in an enterprise environment for other channels such a 2.4 GHz and 5 GHz channels. For instance, a network administrator may retain their control of all channels of network while enabling client to client, or P2P, operation for enterprise environment for mobile devices such as mobile phones and tablets.

Contemporary channel allocations for P2P transfers either transmit communications indirectly through the AP or the AP allocates a TxOP for direct P2P communications. Such transfers may use resources such as the 6 GHz channel inefficiently.

Embodiments may comprise assessment logic circuitry to implement enablement signaling on a link such as a 2.4 GHz link, a 5 GHz link, or a 6 GHz link. Note that while many examples of embodiments discussed herein discuss 2.4 GHz link, a 5 GHz link, or a 6 GHz links, links with any carrier frequency can be improved. Current advantages in the use of 2.4 GHz link, a 5 GHz link, or a 6 GHz link stem from the proliferation of 2.4 GHz link and a 5 GHz link devices as well as the current utility and efficiencies related to the implementation of a 6 GHz link. Embodiments discussed herein will be advantageous from an operational and efficiency standpoint regardless of the carrier frequencies.

Embodiments may comprise assessment logic circuitry to implement a resource assessment stage or resource assessment transmission opportunity (TxOP) prior to allocation of channel resources for a P2P data transfer stage. Some embodiments may implement enablement signaling operations on more than one links. Links may be established (or logical) communications channels between multi-link devices (MLDs). MLDs include more than one stations (STAs). For instance, an access point (AP) MLD and a non-AP MLD may include STAs configured for frequency bands such as a first STA configured for 2.4 GHz communications, a second STA configured for 5 GHz communications, and a third STA configured for 6 GHz communications.

Note that STAs may be AP STAs or non-AP STAs and may each be associated with a specific link of an MLD. Note also that a MLD can include AP functionality for one or more links and, if a STA of the MLD operates as an AP in a link, the STA is referred to as an AP STA. If the STA does not perform AP functionality, or does not operate as an AP, on a link, the STA is referred to as a non-AP STA. In many of the embodiments herein, the AP MLDs operate as APs on active links, and the non-AP MLDs operate as non-AP STAs on active links. However, an AP MLD may also have STAs that operate as non-AP STAs on the same extended service set (ESS) or basic service set (BSS) or other ESS's or BSS's.

In some embodiments, assessment logic circuitry of an AP MLD may comprise one or more links that require enablement signaling operations to support P2P data transfers. One typical network configuration is a star configuration. The star configuration may have STAs wirelessly connected directly to an AP and may wirelessly connect to a series of one or more other devices. For instance, in corporate environments, devices hardwired to networks are being replaced with wireless network devices due to the speeds of wireless communications and the cost advantages.

Such situations may present two layers of P2P communications that an administrator may want to manage. For example, employees may have docking devices to dock laptops as well as a tablets for mobile video capture. The docking station may be a non-AP MLD and may include code to operate as a SoftAp, (software-based AP). The SoftAP may connect to an AP MLD to access network resources such as an enterprise intranet and the Internet. The laptop may be a P2P device that may wirelessly connect to the docking station to transfer data to storage and access the network resources. The tablet may be a second P2P device that may wirelessly connect to laptop to stream video presentations or store video to the laptop. Note that the tablet and laptop may also connect to the AP MLD wirelessly through at least one of the links of the AP MLD.

In some embodiments, assessment logic circuitry of an AP MLD may implement a resource assessment TxOP to allow a STA such as the SoftAP to advantageously capture and process resource assessments for a first data transfer stage prior to entry into the first data transfer stage. For example, the AP MLD may transmit via, e.g., a 6 GHz channel, a resource assessment trigger frame such as a multiple user (MU) physical layer protocol data unit (PPDU). The resource assessment trigger frame may (1) include an enablement signal for use of a channel such as the 6 GHz channel, (2) allocate a TxOP for the 6 GHz channel to the SoftAP for resource assessment, and (3) trigger resource assessments from a group of STAs that might communicate with the SoftAp via the 6 GHz channel during the first data transfer stage.

The SoftAP may receive the resource assessment trigger frame and transmit a secondary trigger frame. The secondary trigger frame may allocate a portion of the TxOP to the group of STAs and may listen to receive short term resource assessment frames from one or more of the STAs in the group of STAs during the portion of the TxOP allocated to the group of STAs.

The group of STAs may generate short term resource assessment frames such as single user (SU) PPDUs, MU PPDUs, or trigger-based (TB) feedback null data PPDUs (NDPs) to indicate resources that are, e.g., currently queued and ready to transmit and/or anticipated to be queued in time to transmit. In some embodiments, the short term resource assessment frame may include a MAC control frame such as a buffer status indication frame; a short physical layer (PHY) frame such as an HE TB feedback frame; or a MAC management action frame.

Note that the use of NDPs may advantageously allow power efficient TB polling of a large number of STAs due to the small frame sizes of NDP frames. Use of SU PPDUs and MU PPDUs may advantageously allow more information to be provided due to the inclusion of a MAC frame in the data portions of such frames.

In further embodiments, the assessment logic circuitry of an AP MLD may additionally or alternatively implement a resource assessment TxOP to allow a STA such as the SoftAP and a second P2P device to advantageously capture and process resource assessments for a first data transfer stage and a second data transfer stage prior to entry into the first data transfer stage. For example, the AP MLD may transmit via, e.g., a 6 GHz channel, a resource assessment trigger frame such as a MU PPDU. The resource assessment trigger frame may (1) allocate a first portion of a TxOP to a first group of STAs and a second portion of the TxOP to a second group of STAs and (2) trigger resource assessments from the first and second groups of STAs.

The SoftAp may listen during the first portion of the TxOP to receive resource assessments from the first group of STAs for the first data transfer stage and the second P2P device may listen during the second portion of the TxOP to receive resource assessments from the second group of STAs for the second data transfer stage. Note that the second P2P device may be part of the first group of STAs and the SoftAP may be part of the second group of STAs. Such embodiments may advantageously increase the spectrum efficiency of the data transfers during both the first data transfer stage and the second data transfer stage.

In some embodiments, the AP MLD may include a 6 GHz AP STA that is also a channel enabler for the 6 GHz channel. In such embodiments, the channel enabler may connect via, e.g., the internet to an automated frequency coordination (AFC) system and operate under the control of the AFC system to prevent harmful interference to microwave links that operate in the band. The AFC system may determine on which frequencies and at what power levels standard-power devices may operate and may, in some embodiments, be aware of the location of the AP MLD. For instance, in some embodiments, standard power devices may be able to operate on 5.925-6.425 GHz and 6.525-6.875 GHz portions of the 6 GHz channel.

Note that a channel enabler may operate on other frequencies such as 2.4 GHz or 5 GHz to offer more control to a network operator even though such frequencies may not require connection to an AFC system or the like. In many embodiments, the AP MLD may transmit a trigger frame in and allocate channel resources to STAs such as the SoftAP and second P2P in the same channel. Note that channel allocations may not necessarily include all resource units (RUs) for the channel. Channel resources may include the number and bandwidth of RUs, the duration of an allocation, and/or the like.

For maintaining a quality of service (QoS), many embodiments define two or more access categories. Access categories may be associated with traffic to define priorities (in the form of parameter sets) for access to a channel for transmissions (or communications traffic) such as managed link transmissions. Many embodiments implement an enhanced distributed channel access (EDCA) protocol to establish the priorities. In some embodiments, the EDCA protocol includes access categories such as best efforts (AC_BE), background (AC_BK), video (AC_VI), and voice (AC_VO). Protocols for various standards provide default values for parameter sets for each of the access categories and the values may vary depending upon the type of a STA, the operational role of the STA, and/or the like.

Embodiments may also comprise assessment logic circuitry to facilitate communications by stations (STAs) in accordance with different versions of Institute of Electrical and Electronics Engineers (IEEE) 802.11 standards for wireless communications such as IEEE 802.11-2020, December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with resource assessment such as channel enablement signaling operations; efficient allocation of resources to P2P stations for a first data transfer stage; efficient allocation of resources to P2P stations for a second data transfer stage; establishment of a resource assessment TxOP; polling mechanism for resource assessment; poll frames for resource assessment; trigger frames for resource assessment; trigger-based frames for resource assessment indications; information provided in resource assessment indications, processing resource assessment indications; and/or the like.

Different technical problems such as those discussed above may be addressed by one or more different embodiments. Embodiments may address one or more of these problems associated with assessment. For instance, some embodiments that address problems associated with resource assessment may do so by one or more different technical means, such as, generating, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA; causing transmission of the MAC resource assessment trigger frame to the first STA and the first group of STAs; and receiving one or more short term resource assessment frames from the first group of STAs, the one or more short term resource assessment frames each comprising an indication of resources for a first data transfer during a first data transfer stage, an interframe space after the first TxOP; receiving a medium access control (MAC) resource assessment trigger frame from an AP STA, the MAC resource assessment trigger frame to allocate a portion of the first transmission opportunity (TxOP) to an apparatus and to request a first resource assessment from a first group of stations (STAs) for evaluation by the apparatus, the first resource assessment to assess peer-to-peer (P2P) data transfers between the first group of STAs and the apparatus; receiving one or more short term resource assessment frames from the first group of STAs, the one or more short term resource assessment frames each comprising an indication of resources for a first data transfer during a first data transfer stage, an interframe space after the first TxOP; and evaluating the one or more short term resource assessment frames from the first group of STAs to determine time resources to allocate to the first group of STAs during a first data transfer stage; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for assessment logic circuitry, in accordance with one or more example embodiments. Wireless network 1000 may include one or more user devices 1020 and one or more access points(s) (AP) 1005, which may communicate in accordance with IEEE 802.11 communication standards. The user device(s) 1020 may comprise mobile devices that are non-stationary (e.g., not having fixed locations) and/or stationary devices.

Figure 3:
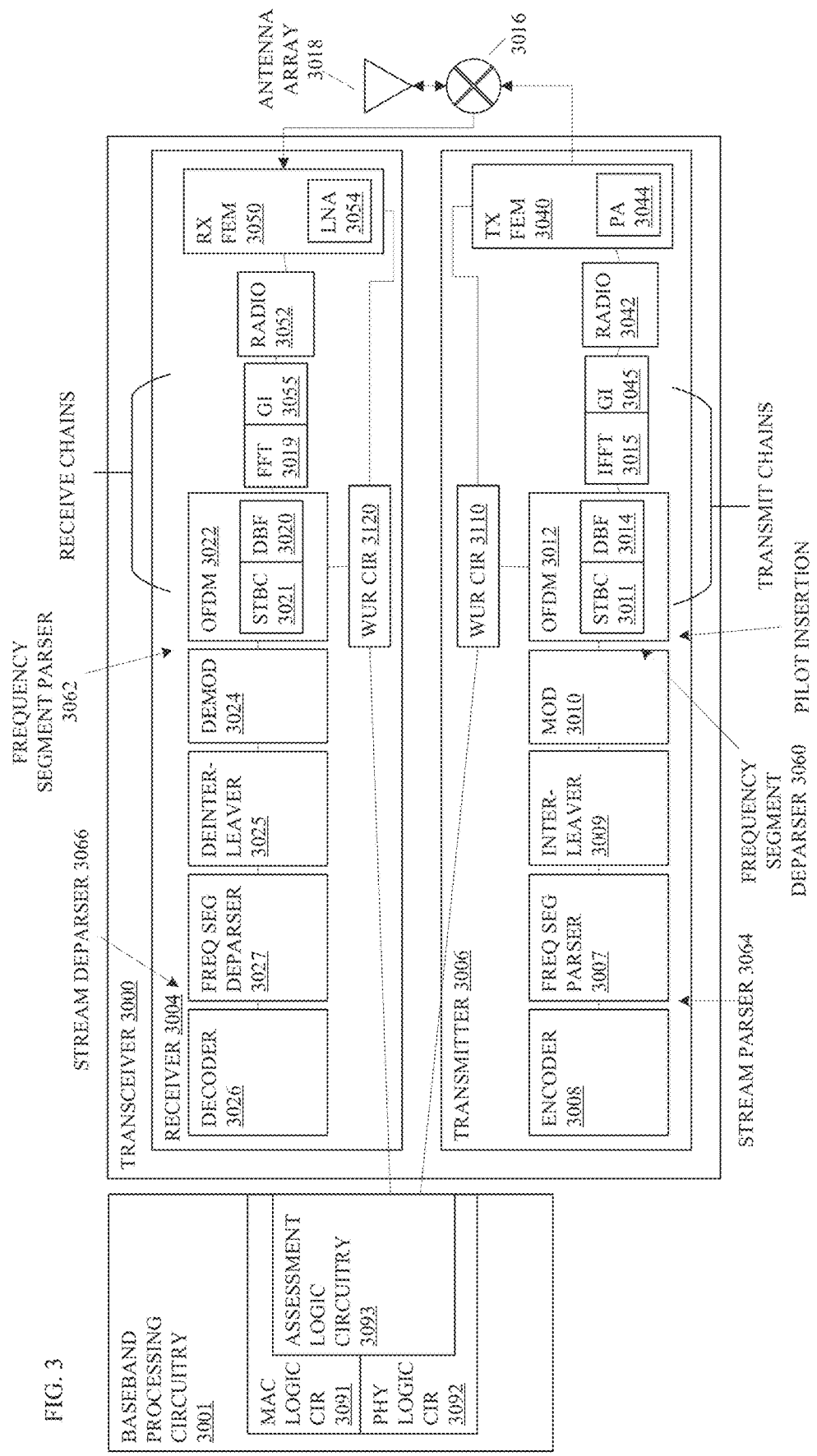
FIG. 3 depicts an embodiment of service period access with assessment logic circuitry.

In some embodiments, the user device(s) 1020 and the AP(s) 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as an extended service set (ESS), a basic service set (BSS), a personal basic service set (PBSS), or a control point/access point (PCP/AP). The user device(s) 1020 (e.g., 1024, 1025, 1026, 1027, 1028, or 1029) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1025, 1026, 1027, 1028, and 1029) and AP(s) 1005 may be configured to communicate with each other via one or more communications networks 1030 and/or 1035 wirelessly or wired. In some embodiments, the user device(s) 1020 may also communicate peer-to-peer or directly with each other with or without the AP(s) 1005 and, in some embodiments, the user device(s) 1020 may also communicate peer-to-peer if enabled by the AP(s) 1005.

Furthermore, the AP(s) 1005 may comprise more than one AP MLDs each comprising assessment logic circuitry to implement enablement signaling operations including a resource assessment TxOP prior one or more data transfer stage. The AP(s) 1005 may comprise 2.4 GHz, 5 GHz, and 6 GHz STAs and may comprise at least one AP that is a channel enabler for 6 GHz with an Internet connection to an AFC system and code such as a software protocol to maintain connection with the AFC system to maintain enablement of a 6 GHz channel.

The assessment logic circuitry of the AP(s) 1005 may implement a polling mechanism for short term scheduling of trigger-based (TB) peer-to-peer (P2P) operation that supports device enablement. The user devices 1020 may be capable of and have a need for P2P communications to transfer data such as video data, audio data, and/or other forms or data amongst the peer stations. For instance, the user devices 1020 may comprise a computer for video rendering and transfer video streams to one or more of the other user devices 1020 such as video glasses 1026 and mobile phone 1024. Similarly, the user devices 1020 may include a laptop 1028 that streams video and audio data to a tablet 1029.

The assessment logic circuitry of the AP(s) 1005 may generate and wirelessly transmit a resource assessment trigger frame (RA TF) 1022 to enable the computer 1025 to generate and wirelessly transmit a second trigger frame on the same channel. The resource assessment trigger frame 1022 may trigger a group of the user devices 1020 (such as the mobile phone 1024, the video glasses 1026, and the laptop 1028) to transmit a resource assessment for a first data transfer stage that starts a short interframe space (SIFS) (or other interframe space) after the resource assessment TxOP.

The computer 1025 may receive the resource assessment trigger frame, be enabled to access the channel by the resource assessment trigger frame, receive an allocation for a portion of the TxOP from the AP(s) 1005 in the resource assessment trigger frame, and generate and wirelessly transmit a second trigger frame on the same channel. A SIFS thereafter, one or more of the user devices 1020 may respond with a short term resource assessment frame with indications of resources anticipated for the first data transfer stage.

In some embodiments, the AP(s) 1005 may also allocate resources on the channel for a second data transfer stage. In some embodiments, the assessment logic circuitry of the AP(s) 1005 may implement a second or alternative resource assessment TxOP for two or more data transfer stages. For instance, the assessment logic circuitry of the AP(s) 1005 may generate and wirelessly transmit a resource assessment trigger frame 1022 to enable the computer 1025 to communicate on the channel. In the same resource assessment trigger frame, the AP(s) 1005 may include allocations for the user devices 1020 to transmit short term resource assessment frames to inform the computer 1025 of the user devices 1020 that have data queued and ready to transmit during the first data transfer stage.

The user devices 1020 such as the mobile phone 1024, computer 1025, video glasses 1026, access point 1027, laptop 1028, and tablet 1029 may receive the resource assessment trigger frame, decode and parse the resource assessment trigger frame, and determine that the resource assessment trigger frame 1022 allocates channel resources to each of these devices during a first portion of the resource assessment TxOP to transmit short term resource assessment frames associated with the first data transfer stage and allocates channel resources to each of these devices during a second portion of the resource assessment TxOP to transmit short term resource assessment frames associated with the second data transfer stage. In response, one or more of the user devices 1020 may wirelessly transmit a first set of short term resource assessment frames associated with the first data transfer stage on the channel a SIFS after receipt of the resource assessment trigger frame, Furthermore, one or more of the user devices 1020 may wirelessly transmit a second set of short term resource assessment frames associated with the second data transfer stage on the channel a SIFS after transmitting the first set of short term resource assessment frames.

The computer 1025 may receive the first set of short term resource assessment frames and evaluate the short term resource assessment frames to determine the channel resources needed for the first data transfer stage. Thereafter, the computer 1025 may receive the second set of short term resource assessment frames and evaluate the second set of short term resource assessment frames to determine the channel resources needed for the second data transfer stage. In some embodiments, the AP(s) 1005 may also receive, decode, and parse the first set and/or the second set of short term resource assessment frames to estimate channel resources to allocate to the computer 1025 during the first data transfer stage and/or the second data transfer stage.

Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1025, 1026, 1027, 1028, and 1029) and AP(s) 1005 may include one or more communications antennas. The one or more communications antennas may be any suitable type of antennas corresponding to the communications protocols used by the user device(s) 1020 (e.g., user devices 1024, 1025, 1026, 1027, 1028, and 1029) and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1025, 1026, 1027, 1028, and 1029) and AP(s) 1005 may be configured to wirelessly communicate in a wireless network. Any of the user device(s) 1020 (e.g., user devices 1024, 1025, 1026, 1027, 1028, and 1029) and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1025, 1026, 1027, 1028, and 1029) and AP(s) 1005 may be configured to perform any given directional transmission towards one or more defined transmit sectors. Any of the user device(s) 1020 (e.g., user devices 1024, 1025, 1026, 1027, 1028, and 1029) and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Figure 1B:
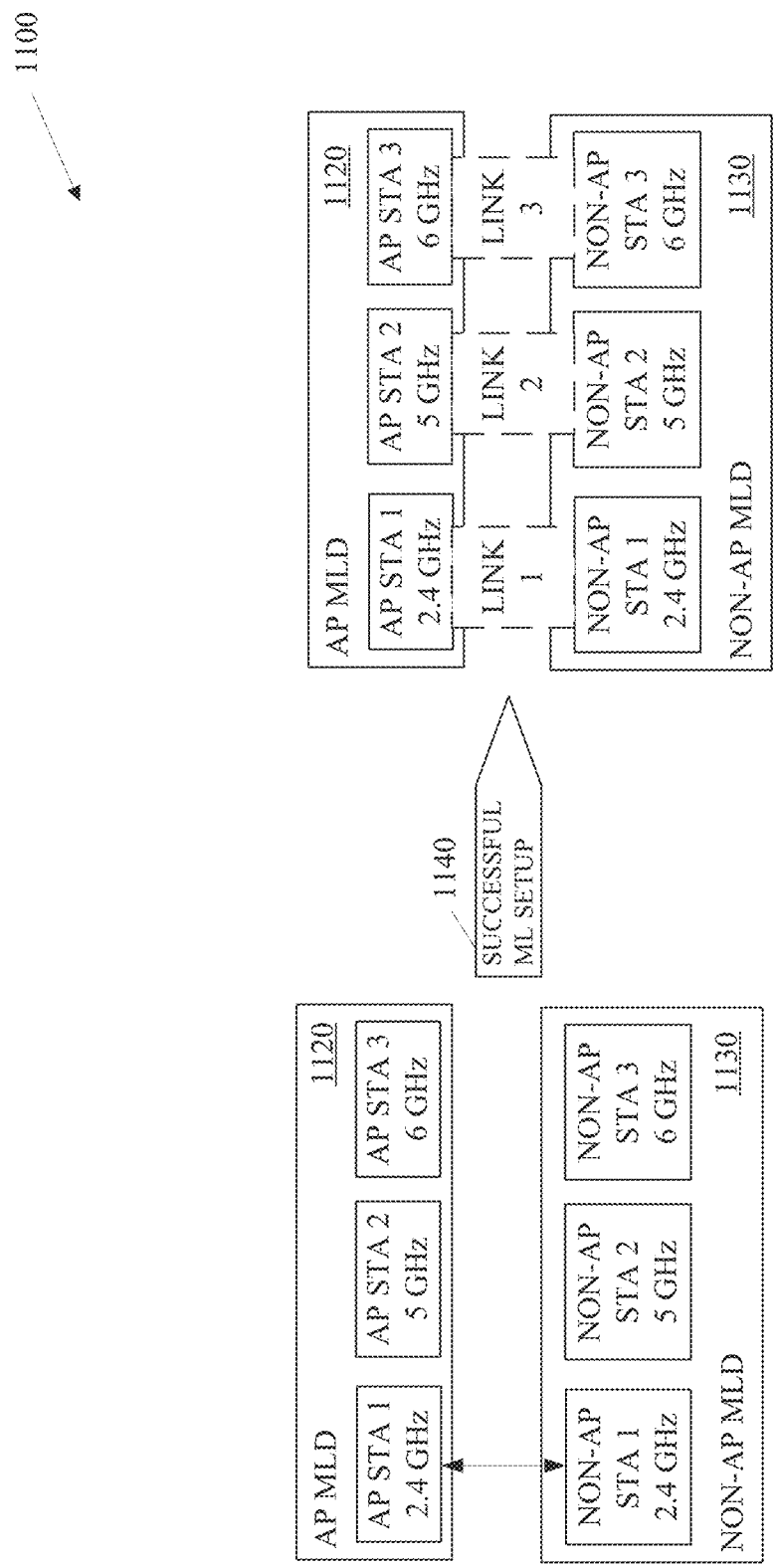
FIG. 1B depicts an embodiment illustrating interactions between stations (STAs) to establish multiple links between an access point (AP) multi-link device (MLD) and a non-AP MLD.

Any of the user devices 1020 (e.g., user devices 1024, 1025, 1026, 1027, 1028, and 1029) and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax, 802.11be), 5 GHz channels (e.g., 802.11n, 802.11ac, 802.11ax, 802.11be), 6 GHz (e.g., 802.11be), or 60 GHz channels (e.g., 802.11ad, 802.11ay, Next Generation Wi-Fi) or 800 MHz channels (e.g., 802.11ah). The communications antennas may operate at 28 GHz, 40 GHz, or any carrier frequency between 45 GHz and 75 GHz. It should be understood that this list of communication channels in accordance with certain 802.11 standards is only a partial list, and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a power amplifier (PA), a low noise amplifier (LNA), additional signal amplifiers, an analog-to-digital (A/D) converter, one or more buffers, and a digital baseband. FIG. 1B depicts an embodiment 1100 illustrating interactions between stations (STAs) to establish multiple links between an access point (AP) multi-link device (MLD) 1120 and a non-AP MLD 1130. The AP MLD 1120 has three affiliated AP STAs: AP STA 1 operates on 2.4 GHz band, AP STA 2 operates on 5 GHz band, and AP STA 3 operates on 6 GHz band. The non-AP STA 1 affiliated with the non-AP MLD 1130 sends an association request frame (or a reassociation request frame) to AP STA 1 affiliated with the AP MLD 1120. The association request frame may have a TA field set to the MAC address of the non-AP STA 1 and an RA field set to the MAC address of the AP STA 1. The association request frame may include complete information of non-AP STA 1, non-AP STA 2, and non-AP STA 3 to request up to four links to be setup (one link between AP STA 1 and non-AP STA 1, one link between AP STA 2 and non-AP STA 2, and one link between AP STA 3 and non-AP STA 3) and a multi-link (ML) element that indicates the MLD MAC address of the non-AP MLD 1130.

AP STA 1, affiliated with the AP MLD 1120, may send an association response frame to non-AP STA 1 affiliated with the non-AP MLD 1130 with a TA field of the association response frame is set to the MAC address of the AP STA 1 and an RA field of the association response frame set to the MAC address of the non-AP STA 1, to indicate successful multi-link setup 1140. The association response frame may include complete information of AP STA 1, AP STA 2, and AP STA 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP STA 3 and non-AP STA 3).

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

During the association process, the AP MLD 1120 may establish communications protocols including identification of any parameters that differ from default parameters, preferential communications protocols, and/or negotiate communications protocols for the links.

Figure 1C:
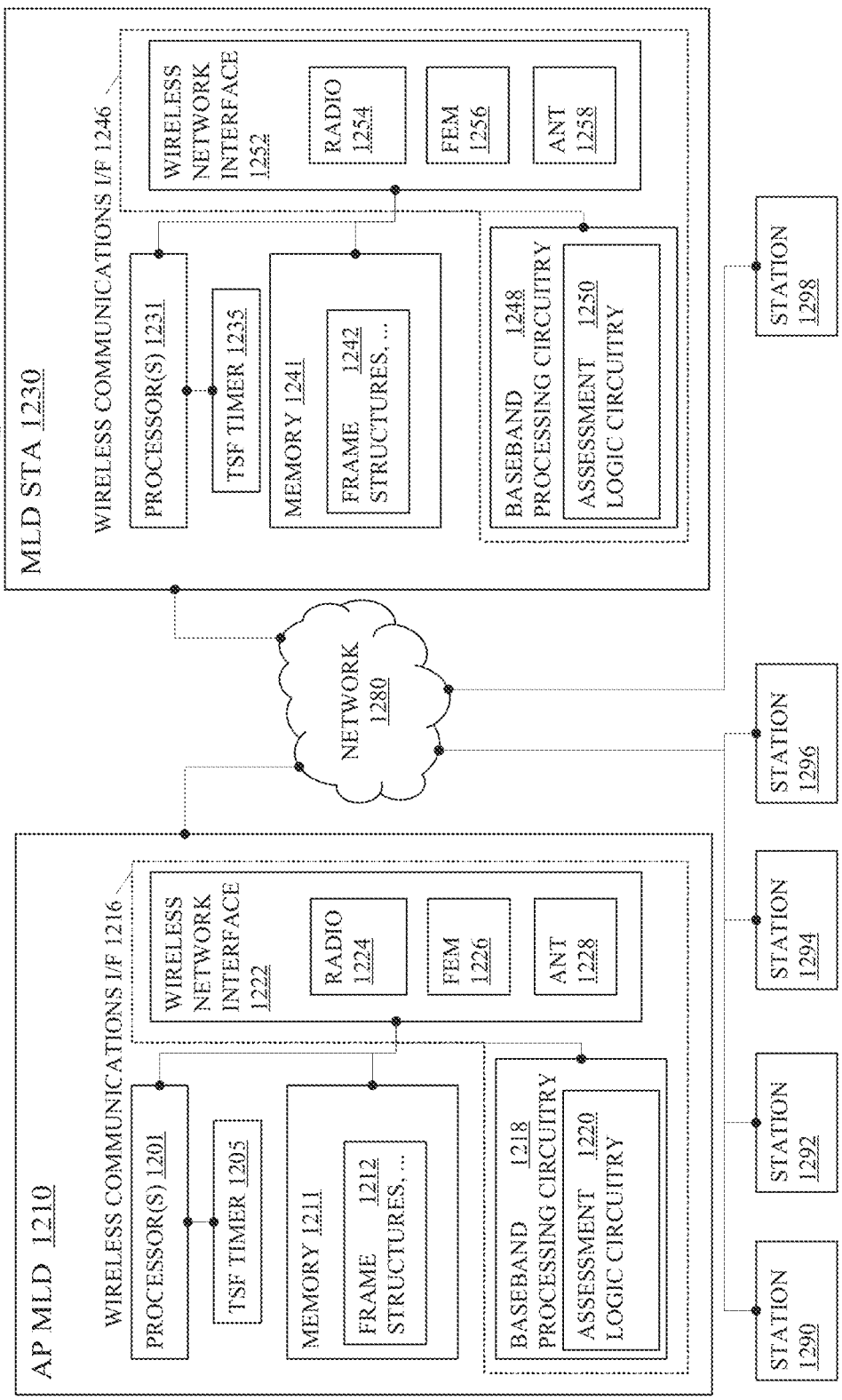
FIG. 1C depicts an embodiment of a system including multiple STAs to implement assessment logic circuitry, in accordance with one or more example embodiments.

FIG. 1C depicts an embodiment of a system 1200 including multiple MLD STAs to implement assessment logic circuitry, in accordance with one or more example embodiments. System 1200 may transmit or receive as well as generate, decode, and interpret transmissions between an AP MLD 1210 and multiple MLD STAs 1230, 1290, 1292, 1294, 1296, and 1298, associated with the AP MLD 1210. The AP MLD 1210 may be wired and wirelessly connected to each of the MLD STAs 1230, 1290, 1292, 1294, 1296, and 1298.

In some embodiments, the AP MLD 1210 and MLD STA 1230 may include one or more computer systems similar to that of the example machines/systems of FIGS. 5, 6, 7, and 8.

Each MLD STA 1230, 1290, 1292, 1294, 1296, and 1298 may include assessment logic circuitry, such as the assessment logic circuitry 1250 of MLD STA 1230, to associate with the AP MLD 1210 to establish TxOPs on the 6 GHz channel via an enablement signaling operation and a TxOP allocation from the assessment logic circuitry 1220 of the AP MLD 1210.

After associating with the AP MLD 1210, the AP MLD 1210 may transmit a resource assessment trigger frame to the MLD STAs 1230, 1290, 1292, 1294, 1296, and 1298. The MLD STA 1230 may receive an allocation of a first portion of the resource assessment TxOP to transmit a second trigger frame. The second trigger frame may allocate a portion of the TxOP for resource assessment responses to the resource assessment trigger frame to each of the MLD STAs 1290, 1292, 1294, 1296, and 1298.

After receipt of the second trigger frame, one or more of the MLD STAs 1290, 1292, 1294, 1296, and 1298 may transmit short term resource assessment frames in response to the resource assessment trigger frame. The MLD STA 1230 may receive and evaluate the short term resource assessment frames and, in some embodiments, the AP MLD 1210 may collect data from the short term resource assessment frames to estimate resources that may be requested by the MLD STA 1230 for the first data transfer stage.

In some embodiments, the assessment logic circuitry 1220 of AP MLD 1210 may allocate a first portion of the resource assessment TxOP to the MLD STAs 1230, 1290, 1292, 1294, 1296, and 1298 to enable the MLD STAs 1230, 1290, 1292, 1294, 1296, and 1298 to respond to the resource assessment trigger frame a SIFS after transmission of the resource assessment trigger frame with a first set of short term resource assessment frames for assessment of channel resources to allocate for the first data transfer stage. In such embodiments, the assessment logic circuitry 1220 of AP MLD 1210 may also allocate a second portion of the resource assessment TxOP to the MLD STAs 1230, 1290, 1292, 1294, 1296, and 1298 to enable the MLD STAs 1230, 1290, 1292, 1294, 1296, and 1298 to respond to the resource assessment trigger frame a SIFS after transmission of the first set of short term resource assessment frames for assessment of channel resources for the second data transfer stage.

The AP MLD 1210 and MLD STA 1230 may comprise processor(s) 1201 and memory 1231, respectively. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or PHY frames and PPDUs.

The baseband processing circuitry 1218 may comprise a baseband processor and/or one or more circuits to implement an MLD management entity and a station management entity per link. The MLD management entity may coordinate management of, communications between, and interactions between station management entities for the links.

In some embodiments, the station management entity may interact with a MAC layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a multiple-user (MU) ready to send (RTS), referred to as a MU-RTS, in a PHY frame such as an extremely high throughput (EHT) MU PPDU to the MLD STA 1230. The MAC layer functionality may generate frames such as management, data, and control frames.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value to indicate the time at which the PPDU is transmitted.

After processing the PHY frame, a radio 1225 may impress digital data onto subcarriers of RF frequencies for transmission by electromagnetic radiation via elements of an antenna array or antennas 1224 and via the network 1280 to a receiving MLD STA such as the MLD STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The MLD STA 1230 may receive the MU-RTS in the EHT MU PPDU from the AP MLD 1210 via the network 1280. The MLD STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PPDUs).

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The MLD STA 1230 may receive the EHT MU PPDU at the antennas 1258, which pass the signals along to the FEM 1256. The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC MU-RTS from the physical layer service data unit (PSDU) of the EHT MU PPDU.

Figure 1D:
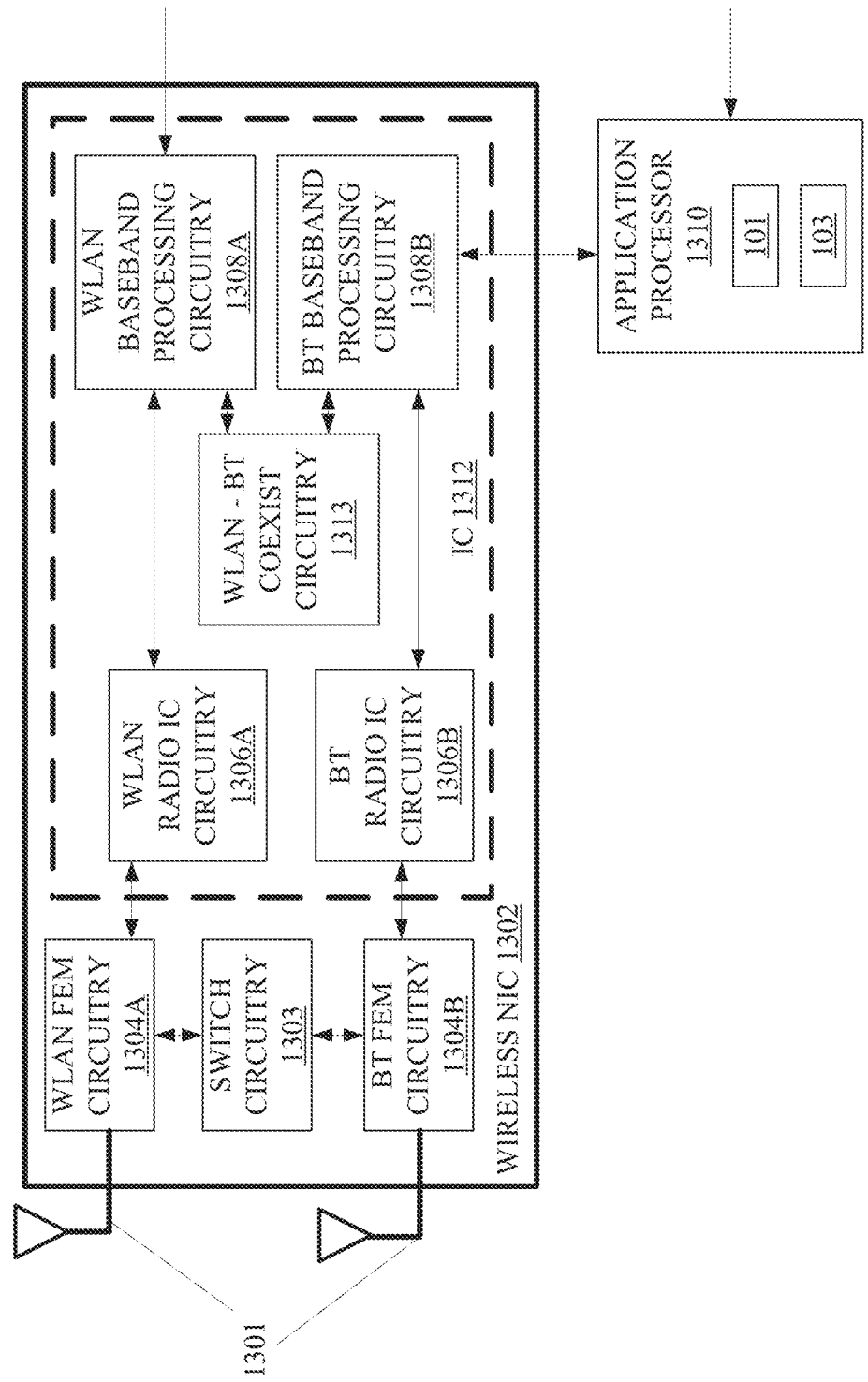
FIG. 1D illustrates an embodiment of a radio architecture for STAs, such as the wireless interfaces for STAs depicted in FIGS. 1A-C, to implement assessment logic circuitry.

FIG. 1D is a block diagram of a radio architecture 1300 such as the wireless communications I/F 1222 and 1252 in accordance with some embodiments that may be implemented in, e.g., the AP MLD 1210 and/or the MLD STA 1230 of FIG. 1C. The radio architecture 1300 may include radio front-end module (FEM) circuitry 1304*a-b*, radio IC circuitry 1306*a-b* and baseband processing circuitry 1308*a-b*. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304a-b may include a WLAN or Wi-Fi FEM circuitry 1304a and a Bluetooth (BT) FEM circuitry 1304b. The WLAN FEM circuitry 1304a may include a receive signal path comprising circuitry configured to operate on WLAN RF signals received from one or more antennas 1301, to amplify the received signals and to provide the amplified versions of the received signals to the WLAN radio IC circuitry 1306a for further processing. The BT FEM circuitry 1304b may include a receive signal path which may include circuitry configured to operate on BT RF signals received from one or more antennas 1301, to amplify the received signals and to provide the amplified versions of the received signals to the BT radio IC circuitry 1306b for further processing. FEM circuitry 1304a may also include a transmit signal path which may include circuitry configured to amplify WLAN signals provided by the radio IC circuitry 1306a for wireless transmission by one or more of the antennas 1301. In addition, FEM circuitry 1304b may also include a transmit signal path which may include circuitry configured to amplify BT signals provided by the radio IC circuitry 1306b for wireless transmission by the one or more antennas. In the embodiment of FIG. 1D, although FEM 1304a and FEM 1304b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 1D, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry, and may further interface with a device for generation and processing of the baseband signals and for controlling operations of the radio IC circuitry 1306a-b.

Referring still to FIG. 1D, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch circuitry 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless network interface card (NIC) 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-n2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308*b* may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies, however.

Figure 1E:
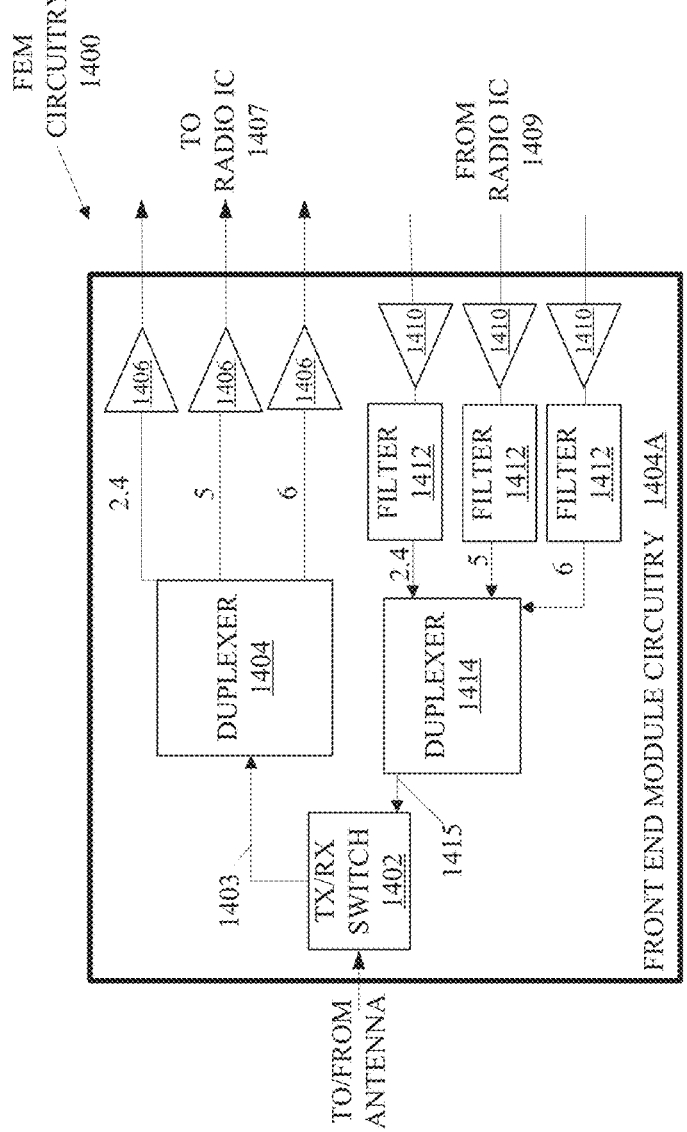
FIG. 1E illustrates an embodiment of front end module (FEM) circuitry of a wireless interface for STAs, such as the STAs in FIGS. 1A-C, to implement assessment logic circuitry.

FIG. 1E illustrates FEM circuitry 1400 such as WLAN FEM circuitry 1304*a* shown in FIG. 1D in accordance with some embodiments. Although the example of FIG. 1E is described in conjunction with the WLAN FEM circuitry 1304*a*, the example of FIG. 1E may be described in conjunction with other configurations such as the BT FEM circuitry 1304*b*.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

Figure 1F:
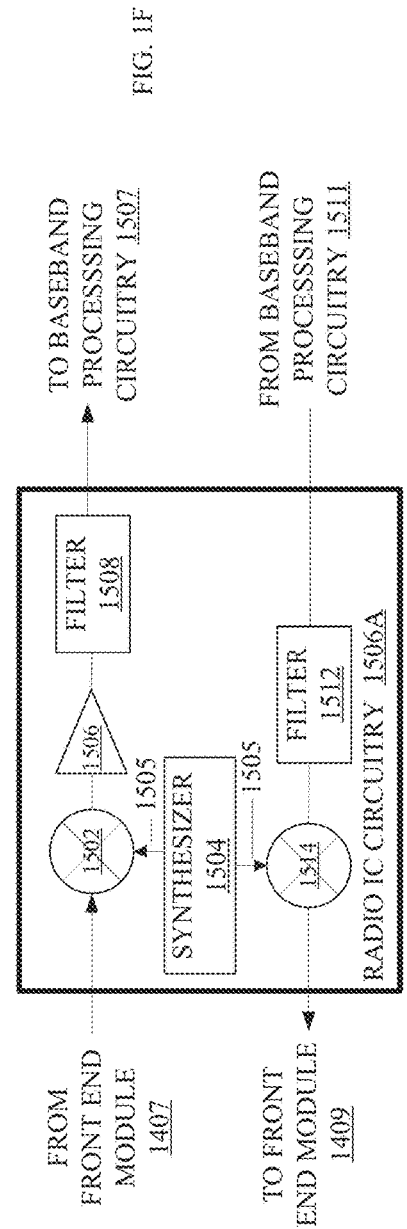
FIG. 1F illustrates an embodiment of radio integrated circuit (IC) circuitry of a wireless interface for STAs, such as the STAs in FIGS. 1A-C, to implement assessment logic circuitry.

FIG. 1F illustrates radio IC circuitry 1506*a* in accordance with some embodiments. The radio IC circuitry 1306*a* is one example of circuitry that may be suitable for use as the WLAN or BT radio IC circuitry 1306*a*/1306*b* (FIG. 1D), although other circuitry configurations may also be suitable. Alternatively, the example of FIG. 1F may be described in conjunction with the example BT radio IC circuitry 1306*b*.

In some embodiments, the radio IC circuitry 1306*a* may include a receive signal path and a transmit signal path. The receive signal path of the radio IC circuitry 1306*a* may include at least mixer circuitry 1502, such as, for example, down-conversion mixer circuitry, amplifier circuitry 1506 and filter circuitry 1508. The transmit signal path of the radio IC circuitry 1306*a* may include at least filter circuitry 1512 and mixer circuitry 1514, such as, for example, up-conversion mixer circuitry. Radio IC circuitry 1306*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either of the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1G:
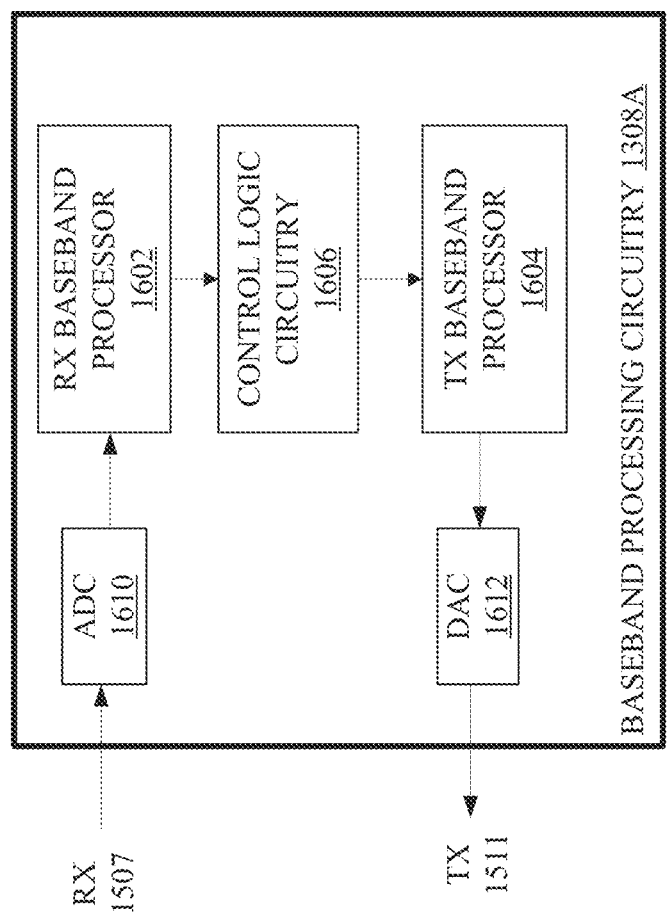
FIG. 1G illustrates an embodiment of baseband processing circuitry of a wireless interface for STAs, such as the STAs in FIGS. 1A-C, to implement assessment logic circuitry.

FIG. 1G illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio IC circuitry 1306*a-b* (FIG. 1D) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figure 2A:
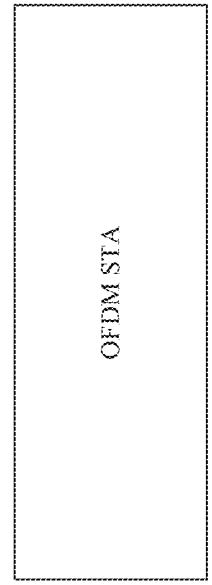
FIG. 2A depicts an embodiment of transmissions between four stations and an AP.
Figure 2B:
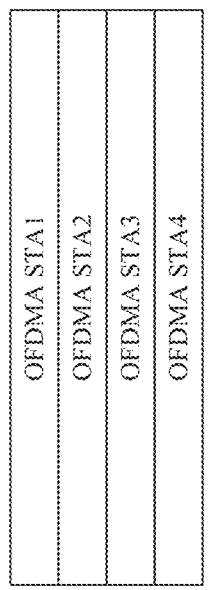
FIG. 2B depicts an embodiment of a transmission between one station and an AP.
Figure 2C:
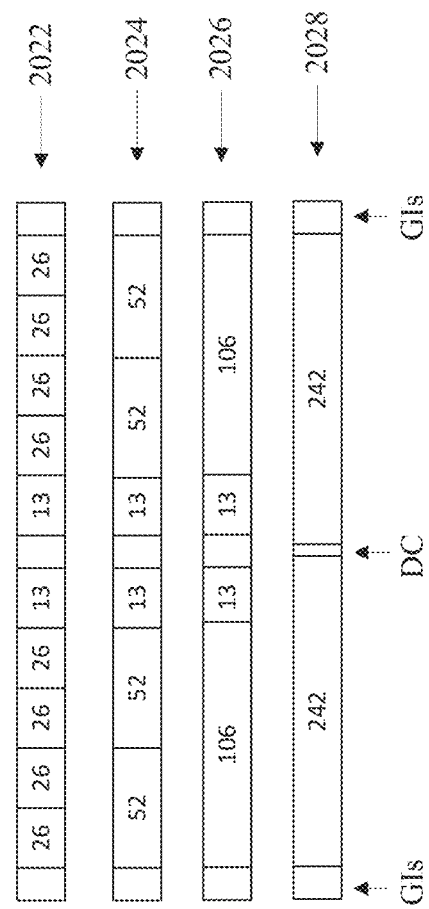
FIG. 2C depicts an embodiment of a resource units in a 20 Megahertz (MHz) bandwidth.

FIGS. 2A-2C illustrate embodiments of channels and subchannels (or resource units) that can facilitate multiple transmissions simultaneously along with transmission of a WUR PPDU. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth PPDUs using frequency division multiple access (FDMA). Such embodiments may include, e.g., 1 PPDU per 20 MHz bandwidth, 2 PPDU in a 40 MHz bandwidth, and 4 PPDUs in an 80 MHz bandwidth. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 tones (or subcarriers) for data transmission including the two sets of 13 tones on either side of the DC. The RU configuration 2024 illustrates the same bandwidth divided into 5 RUs including four RUs with 52 tones and one RU with 26 tones about the DC for data transmission. The RU configuration 2026 illustrates the same bandwidth divided into 3 RUs including two RUs with 106 tones and one RU with 26 tones about the DC for data transmission. And the RU configuration 2028 illustrates the same bandwidth divided into 2 RUs including two RUs with 242 tones about the DC for data transmission. Embodiments may be capable of additional or alternative bandwidths such as such as 40 MHz, 80 MHz, 160 MHz, 240 MHz, and 320 MHz.

Many embodiments support RUs of 26-tone RU, 52-tone RU, 106-tone RU, 242-tone RU, 484-tone RU, 996-tone RU, 2×996-tone RU, and 4×996-tone RU. In some embodiments, RUs that are the same size or larger than 242-tone RUs are defined as large size RUs and RUs that are smaller than 242-tones RUs are defined as small size RUs. In some embodiments, small size RUs can only be combined with small size RUs to form small size MRUs. In some embodiments, large size RUs can only be combined with large size RUs to form large size MRUs.

FIG. 2D illustrates an embodiment of a HE MU PPDU 2100 in the form of an 802.11, orthogonal frequency division multiple access (OFDMA) packet on a 20 MHz channel of, e.g., a 2.4 GHz link, a 5 GHz link, a 6 GHz link, or any other frequency. In some embodiments, the baseband processing circuitry, such as the baseband processing circuitry 1218 in FIG. 1C, may transmit a HE MU PPDU 2100 transmission on the 6 GHz carrier frequency, optionally with beamforming. In some embodiments, the HE MU PPDU 2100 may comprise a MAC MU trigger frame to identify a transmission opportunity (TxOP) for the target STAs or initiate a beamforming procedure for the target STAs.

The HE MU PPDU 2100 may comprise a legacy preamble 2110 to notify other devices in the vicinity of the source STA, such as an AP STA, that the 20 MHz channel is in use for a duration included in the legacy preamble 2110. The legacy preamble 2110 may comprise one or more short training fields (L-STFs), one or more long training fields (L-LTFs), and one or more signal fields (L-SIG and RL-SIG).

The HE MU PPDU 2100 may also comprise a HE preamble 2120 to identify a subsequent 6 GHz carrier link transmission as well as the STAs that are the targets of the transmission. Similarly, the HE preamble 2120 may comprise one or more short training fields (HE-STFs), one or more long training fields (HE-LTFs), and one or more signal fields (HE-SIG).

After the HE preamble 2120, the HE MU PPDU 2100 may comprise a data portion 2140 that includes a single user (SU) or multiple user (MU) packet. FIG. 2D illustrates the MU packet with four designated RUs. Note that the number and size of the RUs may vary between packets based on the number of target STAs and the types of payloads in the data portions 2140.

FIG. 2E depicts another embodiment of the resource assessment trigger frame in the HE MU PPDU 2200. In some embodiments, the HE MU PPDU 2200 may be a frame format used for a DL transmission to one or more STAs. In the HE MU PPDU 2200, the short term resource indication frame may comprise two legacy (L) short training fields (STFs) with an 8 microseconds duration each, a legacy (L) signal (SIG) field with a four microsecond duration, a repeated, legacy signal field (RL-SIG) with a 4 microsecond duration, and a U-SIG with 2 symbols having a 4 microsecond duration each. The HE MU PPDU 2200 format may also comprise a HE signal field (HE-SIG) with 2 symbols at 4 microseconds each, an HE STF, a number of HE-LTFs, a data field, and a PE field. In some embodiments, the data field may comprise may be a MAC frame.

As illustrated in FIG. 2F, the data field of the HE MU PPDU 2200 may comprise a MAC frame 2210. The data field may comprise an MPDU (PSDU) such as a MAC trigger frame. The MAC trigger frame may include a 2 octet frame control field, a 2 octet duration field, a 6 octet receiver address (RA) field, a 6 octet transmitter address (TA) field, an 8 or more octet common info field, a variable user info list field, a padding field, and a 4 octet frame check sequence field comprising a value, such as a 32-bit cyclic redundancy code (CRC), to check the validity of and/or correct preceding frame.

The RA field of the RTS frame may comprise the address of the STA that is the intended immediate recipient of a pending individually addressed frame or a broadcast address if the frame is directed towards one or more group of STAs. The TA field may be the address of the STA transmitting the Trigger frame if the Trigger frame is addressed to STAs that belong to a single BSS. The TA field may be the transmitted basic service set identifier (BSSID) if the Trigger frame is addressed to STAs from at least two different BSSs of the multiple BSSID set.

The Duration field may be the time, in microseconds, required to transmit the pending Data or Management frame, plus, in some embodiments, one Ack frame and one or more short interframe spaces (SIFSs). If the calculated duration includes a fractional microsecond, that value may be rounded up to the next higher integer.

The Common Info field may include one or more fields with information about the trigger frame such as the trigger type and UL length, and other fields shown in FIG. 2D. For instance, if the trigger frame is transmitted in a directional transmission in a sector with more than on STA and the trigger frame is broadcast (transmitted with a broadcast address), then more than one STA may receive the trigger frame.

The user list info List field may include zero or more User Info fields. Each User Info Fields may include fields to identify a STA as well as information about a response to a trigger frame. The padding field may include padding bits and the frame check sequence (FCS) field may include a sequence of bits such as a 32-bit cyclic redundancy check (CRC).

FIG. 2G depicts an embodiment of a short term resource indication frame 2230 such as the short term resource indication frame shown in FIG. 2L-M. The short term resource indication frame 2230 format may be a high efficiency (HE) single user (SU) physical layer protocol data unit (PPDU). The short term resource indication frame 2230 may comprise two legacy (L) short training fields (STFs) with an 8 microseconds duration each, a legacy (L) signal (SIG) field with a four microsecond duration, a repeated, legacy signal field (RL-SIG) with a 4 microsecond duration. The short term resource indication frame 2230 format may also comprise a HE signal field (HE-SIG) with 2 symbols at 4 microseconds each, an HE STF, a number of HE-LTFs, a data field, and a PE field. In some embodiments, the data field may comprise may be a MAC management action frame or a MAC control frame.

FIG. 2H depicts another embodiment of a short term resource indication frame such as the short term resource indication frame shown in FIG. 2L-M. The short term resource indication frame 2230 format may be a high efficiency (HE) multiple user (MU) physical layer protocol data unit (PPDU). The short term resource indication frame 2240 may comprise two legacy (L) short training fields (STFs) with an 8 microseconds duration each, a legacy (L) signal (SIG) field with a four microsecond duration, a repeated, legacy signal field (RL-SIG) with a 4 microsecond duration. The short term resource indication frame 2240 format may also comprise a HE signal field (HE-SIG-A) with 2 symbols at 4 microseconds each, a HE signal field (HE-SIG-B) with 2 symbols at 4 microseconds each, a HE STF, a number of HE-LTFs, a data field, and a PE field. In some embodiments, the data field may comprise may be a MAC management action frame or a MAC control frame.

FIG. 2I depicts another embodiment of a short term resource indication frame such as the short term resource indication frame shown in FIG. 2L-M. The short term resource indication frame 2250 format may comprise a PHY null data PPDU, wherein the PHY null data PPDU does not contain a MAC frame as a payload in the data field.

The short term resource indication frame 2250 format may be a high efficiency (HE) trigger-based (TB) Feedback null data PPDU (NDP). The short term resource indication frame 2230 may comprise two legacy (L) short training fields (STFs) with an 8 microseconds duration each, a legacy (L) signal (SIG) field with a four microsecond duration, a repeated, legacy signal field (RL-SIG) with a 4 microsecond duration. The short term resource indication frame 2230 format may also comprise a HE signal field (HE-SIG-A) with 2 symbols at 4 microseconds each, a HE STF, a data field, and a PE field.

FIGS. 2J-K illustrates an example of a PPDU 2260 with a control frame that may be transmitted by an MLD STA to an AP MLD in response to receipt of a trigger frame. In FIG. 2J, the PPDU 2260 format may be used for a transmission that is a response to a triggering frame from an AP STA. In some embodiments, the response may include a MAC data frame or a MAC control frame.

The PPDU 2260 format may comprise an OFDM PHY preamble, an OFDM PHY header, a PSDU, tail bits, and pad bits. The PHY header may contain the following fields: length, rate, a reserved bit, an even parity bit, and the service field. in terms of modulation, the length, rate, reserved bit, and parity bit (with 6 zero tail bits appended) may constitute a separate single OFDM symbol, denoted signal, which is transmitted with the combination of BPSK modulation and a coding rate of R=1/2.

The PSDU (with 6 zero tail bits and pad bits appended), denoted as data, may be transmitted at the data rate described in the rate field and may constitute multiple OFDM symbols. The tail bits in the signal symbol may enable decoding of the rate and length fields immediately after reception of the tail bits. The rate and length fields may be required for decoding the data field of the PPDU.

In FIG. 2K, the data field of the PPDU may comprise an MPDU such as a MAC control frame 2270. The MAC control frame 2270 may include a 2 octet frame control field, a 2 octet duration field, a 6 octet RA field, and a 4 octet frame check sequence field comprising a value, such as a 32-bit CRC, to check the validity of and/or correct preceding frame. In some embodiments, the MAC control frame 2270 may be generated in response to receipt by a STA of a MAC trigger frame such as the HE MU PPDU 2100.

In several embodiments, the value of the RA field of the MAC control frame is set to the address from the TA field of the trigger frame FIGS. 2L-M illustrate different timing diagrams 2500 and 2600 for communications between the STAs: AP1, SoftAP, P2P STA, and AP2) such as AP MLD 1210 and MLD STA 1230 shown in FIG. 1C. FIG. 2L depicts an embodiment of a timing diagram 2500 to implement assessment logic circuitry such as the assessment logic circuitry described in conjunction with FIGS. 1C and 3. The assessment logic circuitry of the AP1 (such as the AP MLD 1210 shown in FIG. 1C) may cause transmission of a resource assessment trigger frame 2505 such as a the HE MU PPDU 2100 and 2200 shown in FIGS. 2D-E and the MAC trigger frame 2210 shown in FIG. 2F. The AP1 may transmit the resource assessment trigger frame 2505 as a multiple user packet such as HE MU PPDU 2100 on multiple RUs of the channel (e.g., 20 MHz, 40 MHz, 80 MHz, 160 MHz, and/or the like) to trigger resource assessments by the P2P STA and AP2 for a first data transfer stage. The resource assessment trigger frame 2505 may also allocate the TxOP to the SoftAP for resource assessment, advantageously allowing the SoftAP to determine resources more accurately (time, bandwidth, number of RUs, and/or the like) for the first data transfer stage.

The assessment logic circuitry of the SoftAP may receive the resource assessment trigger frame 2505 and, an IFS 2510 after transmission of the resource assessment trigger frame 2505, the assessment logic circuitry of the SoftAP may transmit a second trigger frame 2530 to STAs (AP1, P2P STA, and AP2) to sub-allocate a time slot within the TxOP for resource assessment for the first data transfer stage. The second trigger frame may allocate a time slot for the STAs (AP1, P2P STA, and AP2) to respond to the resource assessment trigger frame 2505.

An IFS 2510 after transmission of the second trigger frame 2530, the SoftAP may listen to receive the short term resource assessments from the STAs (P2P STA, and AP2) and the STAs (P2P STA, and AP2) may begin to transmit resource assessments in the form of short term resource assessment frames 2540, 2542, and 2544, respectively, on different RUs of the channel. In other embodiments, the SoftAP may be capable of transmitting and receiving transmissions concurrently and, in such embodiments, the SoftAP may transmit a short term resource assessment frame for a second data transfer stage concurrently with receipt of short term resource assessment frames 2540, 2542, and 2544.

FIG. 2M depicts another embodiment of a timing diagram 2600 to implement assessment logic circuitry such as the assessment logic circuitry described in conjunction with FIGS. 1C and 3. The assessment logic circuitry of the AP1 (such as the AP MLD 1210 shown in FIG. 1C) may cause transmission of a resource assessment trigger frame 2605 such as a the HE MU PPDU 2100 and 2200 shown in FIGS. 2D-E and the MAC trigger frame 2210 shown in FIG. 2F. The AP1 may transmit the resource assessment trigger frame 2605 as a multiple user packet such as HE MU PPDU 2100 on multiple RUs of the channel (e.g., 20 MHz) to trigger resource assessments by the SoftAP, P2P STA, and AP2 for a first data transfer stage and a second data transfer stage by allocating a first time slot to SoftAP, P2P STA, and AP2 for the first data transfer stage and by allocating a second time slot to SoftAP, P2P STA, and AP2 for the second data transfer stage.

An IFS 2610 after transmission of the resource assessment trigger frame 2605, the STAs (P2P STA, and AP2) may begin to transmit resource assessments in the form of short term resource assessment frames 2630 and 2632 on different RUs of the channel. The SoftAP does not respond to the resource assessment trigger frame 2605 with a short term resource assessment frame because the first data transfer stage may involve transfers of data from the STAs (P2P STA, and AP2) to the SoftAP. Instead, the SoftAp may respond to the resource assessment trigger frame 2605 by listening to receive the short term resource assessment frames from the STAs (P2P STA, and AP2) so the SoftAP can more accurately determine the resources needed during the first data transfer stage to transfer the data from the STAs (P2P STA, and AP2) to the SoftAP.

An IFS 2610 after transmission of a first set of short term resource assessment frames 2630 and 2632, the STAs (AP1, SoftAP, and AP2) may transmit a second set of short term resource assessment frames 2640, 2642, and 2644 from the STAs (AP1, SoftAP, and AP2, respectively). Each of the STAs (AP1, SoftAP, and AP2) may transmit the short term resource assessment frames 2640, 2642, and 2644, respectively, because each of these STAs may request an allocation during the second data transfer stage. The first data transfer stage may begin an IFS 2610 thereafter. Note that the IFS 2610 may comprise a SIFS in some embodiments and other IFS in other embodiments.

In other embodiments, the SoftAP and the P2P STA may be capable of transmitting and receiving transmissions concurrently and, in such embodiments, the SoftAP and the P2P may transmit a short term resource assessment frames for a data transfer stage concurrently with receipt of short term resource assessment frames for a data transfer stage.

FIG. 3 depicts an embodiment of an apparatus to generate, transmit, receive, and interpret or decode PHY frames and MAC frames. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. In the present embodiment, the MAC logic circuitry 3091 and PHY logic circuitry 3092 may comprise assessment logic circuitry 3093 to implement assessment protocols for the apparatus. For example, the assessment logic circuitry of an AP MLD and a non-AP MLD may implement an enablement signaling operation for sharing an unlicensed, partially licensed, fully licensed or shared channel such as a 2.4 GHz channel, a 5 GHz channel, or a 6 GHz channel with P2P STAs. For 2.4 GHz and 5 GHz channels, which are unlicensed channels, the enablement signaling operation may offer network administrators in an enterprise environment an ability to manage and control channel usage by mobile STAs, by opening the enablement of mobile usages in the enterprise environment. For 6 GHz, which may be a local licensed or privately licensed channel that requires signal decoding via a channel enabler, the AP MLD may act as the channel enabler for allocating time and channel resources of the 6 GHz channel to P2P STAs.

The assessment logic circuitry of an AP MLD may efficiently allocate channel resources to a first P2P STA such as a SoftAP by triggering a resource assessment for the SoftAP prior to a first data transfer stage. In some embodiments, the AP MLD may efficiently allocate channel resources to a first P2P STA and a second P2P STA by triggering a first resource assessment for the first data transfer stage and a second resource assessment for the second data transfer stage an IFS (e.g., SIFS) thereafter. With such resource assessments, the first P2P STA and the second P2P STA will have recent indications of the resource allocation requirements and the STAs involved with the data transfers during the first data transfer stage and the second data transfer stage, respectively.

The MAC logic circuitry 3091 may determine a frame such as a MAC control frame and the PHY logic circuitry 3092 may determine the physical layer protocol data unit (PPDU) by prepending the frame, also called a MAC protocol data unit (MPDU), with a physical layer (PHY) preamble for transmission of the MAC control frame via the antenna array 3018 and cause transmission of the MAC control frame in the PPDU.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g., a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers, so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU based upon a format defined in the communications device for a frame to determine the particular type of frame by determining the type value and the subtype value. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

Figure 4A:
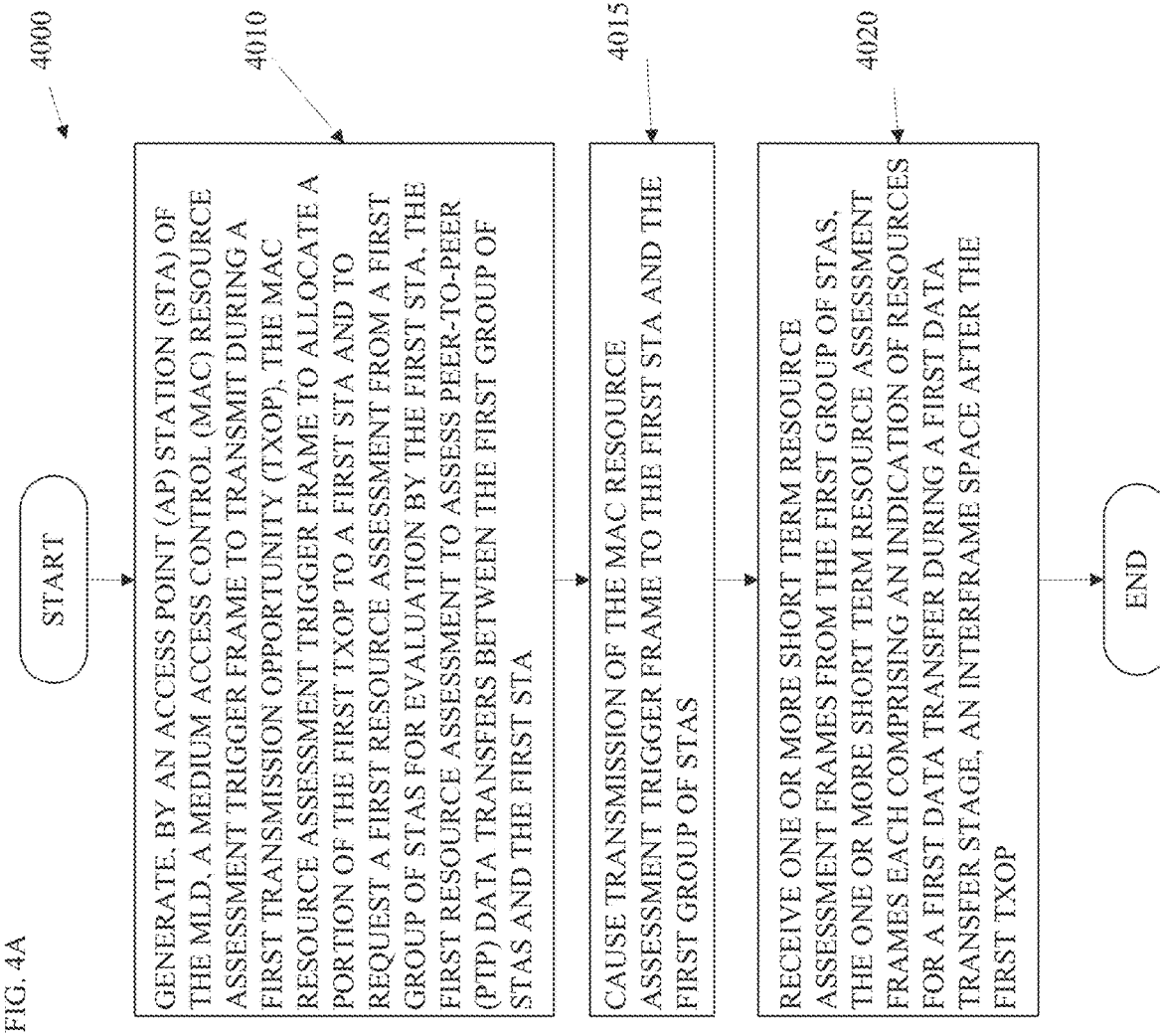
FIG. 4A depicts an embodiment of a flowchart to implement assessment logic circuitry.

FIG. 4A depicts an embodiment of a flowchart 4000 to implement assessment logic circuitry such as the assessment logic circuitry discussed in FIGS. 1-3. At element 4010, assessment logic circuitry of an AP MLD (e.g., the assessment logic circuitry 1220 of the AP MLD 1210 or the assessment logic circuitry 1250 of MLD STA 1230 shown FIG. 1C) may generate, by an AP MLD, a MAC resource assessment trigger frame to transmit during a first transmission opportunity (TxOP). The MAC resource assessment trigger frame may allocate a portion of the first TxOP to a first STA and may request a first resource assessment from a first group of STAs for evaluation by the first STA. The first resource assessment may assess peer-to-peer (P2P) data transfers between the first group of STAs and the first STA. In many embodiments, the each of the indications of resources may comprise at least an indication that the corresponding STA of the first group of STAs has data queued and ready to transmit during the first data transfer stage. In several embodiments, each of the indications of resources may comprise at least an indication of an availability to transmit an increased, reduced or full resource for the first data transfer. Note that the increased, reduced or full resource are relative to a peer-to-peer traffic specification (PTP TSPEC). In some embodiment, the TSPEC is agreed to during association of the AP MLD with the first STA and the first group of STAs via the link on which the MAC resource assessment trigger frame is transmitted or one of the other links of the AP MLD. In some embodiments, advantageously, an absence of a response from one or more of the STAs in the first group to the MAC resource assessment trigger frame may indicate a lack of readiness to transmit data during the first data transfer stage. For instance, a P2P STA that does not have data ready to transmit or is in a power-save mode during the transmission of the MAC resource assessment trigger frame may not respond to the MAC resource assessment trigger frame, advantageously conserving power and reducing unnecessary traffic on the channel.

At element 4015, the AP MLD may cause transmission of the MAC resource assessment trigger frame to the first STA and the first group of STAs. At element 4020, the AP MLD may receive one or more short term resource assessment frames from the first group of STAs, the one or more short term resource assessment frames each comprising an indication of resources for a first data transfer during a first data transfer stage, an interframe space after the first TxOP. It is understood that the above descriptions are for purposes of illustration and are not meant to be limiting.

In some embodiments, the AP MLD may optionally, use information from the one or more short term resource assessment frames to estimate resources to allocate to the first station for the first data transfer during the first data transfer stage.

In some embodiments, the MAC resource assessment trigger frame may trigger a transmission of a second trigger frame by the first STA, the second trigger frame to allocate a portion of the first TxOP to the first group of STAs to respond to the MAC resource assessment trigger frame. In such embodiments, the first STA may advantageously perform a resource assessment for the first data transfer stage based on receipt of the short term resource assessment frames. The transmission of the second trigger frame by the first STA may be a short interframe space (SIFS) after transmission of the MAC resource assessment trigger frame. In other embodiments, the transmission of the second trigger frame may be a different IFS after the after transmission of the MAC resource assessment trigger frame.

In other embodiments, the MAC resource assessment trigger frame to further request a second resource assessment from a second group of STAs for evaluation by a second STA. The second group of STAs may include the first STA because, e.g., the first STA may describe data to transfer to another STA during a second data transfer stage.

The second STA may be one of STAs in the first group of STAs and the second resource assessment may assess peer-to-peer (P2P) data transfers between the second group of STAs and the second STA during the second data transfer stage. Note that the second data transfer stage is subsequent to the first data transfer stage.

In some embodiments, the AP MLD may cause transmission of the MAC resource assessment trigger frame on the 6 GHz channel, wherein the MAC resource assessment trigger frame comprises an enabling signal for access to the 6 GHz channel and the AP MLD comprises a channel enabler for the 6 GHz channel. The AP MLD, as a channel enabler, may operate under the control of an automated frequency coordination (AFC) system. For instance, the AFC system may determine on which frequencies and at what power levels standard-power devices may operate in the 6 GHz channel.

Figure 4B:
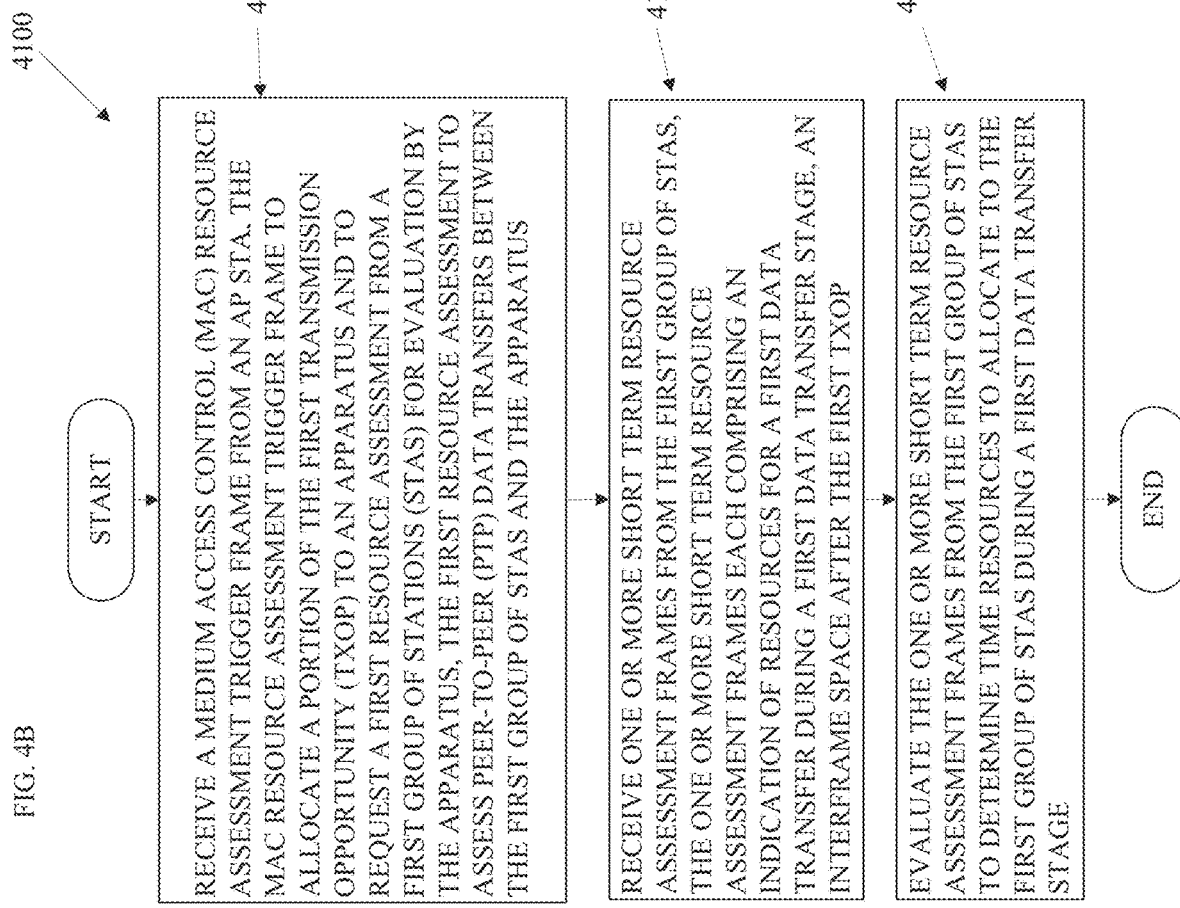
FIG. 4B depicts another embodiment of a flowchart to implement assessment logic circuitry.

FIG. 4B depicts another embodiment of a flowchart 4100 to implement assessment logic circuitry. At element 4110, assessment logic circuitry of a non-AP MLD (e.g., the assessment logic circuitry 1220 of the AP MLD 1210 or the directional logic circuitry 1250 of MLD STA 1230 shown FIG. 1C) may receive a medium access control (MAC) resource assessment trigger frame from an AP MLD, the MAC resource assessment trigger frame to allocate a portion of the first transmission opportunity (TxOP) to the non-AP MLD and to request a first resource assessment from a first group of stations (STAs) for evaluation by the non-AP MLD. The first resource assessment may assess peer-to-peer (P2P) data transfers between the first group of STAs and the non-AP MLD. In some embodiments, the non-AP MLD may transmit a second trigger frame in response to receipt of the MAC resource assessment trigger frame. The second trigger frame may allocate a portion of the first TxOP to the first group of STAs to respond to the MAC resource assessment trigger frame. In other embodiments, the MAC resource assessment trigger frame may further request a second resource assessment from a second group of STAs for evaluation by a second STA. The second group of STAs may include the non-AP MLD. The second STA may also be one of STAs in the first group of STAs. For instance, the second STA may be a relay STA for two or more other P2P STAs and may receive data from or transmit data to the non-AP MLD. The second STA may also, during a second data transfer stage, transmit data to or receive data from another P2P STA. The second resource assessment may assess P2P data transfers between the second group of STAs and the second STA during the second data transfer stage and the second data transfer stage subsequent to the first data transfer stage.

At element 4115, the non-AP MLD may receive one or more short term resource assessment frames from the first group of STAs. The one or more short term resource assessment frames each comprise an indication of resources for a first data transfer during a first data transfer stage, an interframe space after the first TxOP. Each of the indications of resources may comprise at least an indication that the corresponding STA of the first group of STAs has data queued and ready to transmit during the first data transfer stage. In some embodiments, each of the indications of resources may comprise at least an indication of an availability to transmit an increased, reduced or full resource for the first data transfer, wherein the increased, reduced or full resource indications are relative to a peer-to-peer traffic specification (PTP TSPEC). If, on the other hand, one or more of the STAs in the first group of STAs does not respond, the non-AP MLD may assume that the STAs that did not respond are not ready to transmit data during the first data transfer stage for some reason. For instance, the STA may be in a power save mode or may not have data queued and ready to transmit during the first data transfer stage. This advantageously allows STAs to conserve power and minimizes traffic on the link.

In element 4120, the non-AP MLD may evaluate the one or more short term resource assessment frames from the first group of STAs to determine time resources to allocate to the first group of STAs during a first data transfer stage. In some embodiments, evaluation may involve identifying a codebook code pattern on four of the HE-LTFs in a PHY NDP packet such as a high efficiency trigger-based feedback null data unit (HE TB Feedback NDP). In other embodiments, the evaluation may involve parsing a MAC frame in a high efficiency single user physical layer protocol data unit (HE SU PPDU) or a high efficiency multiple user physical layer protocol data unit (HE MU PPDU).

Figure 4C:
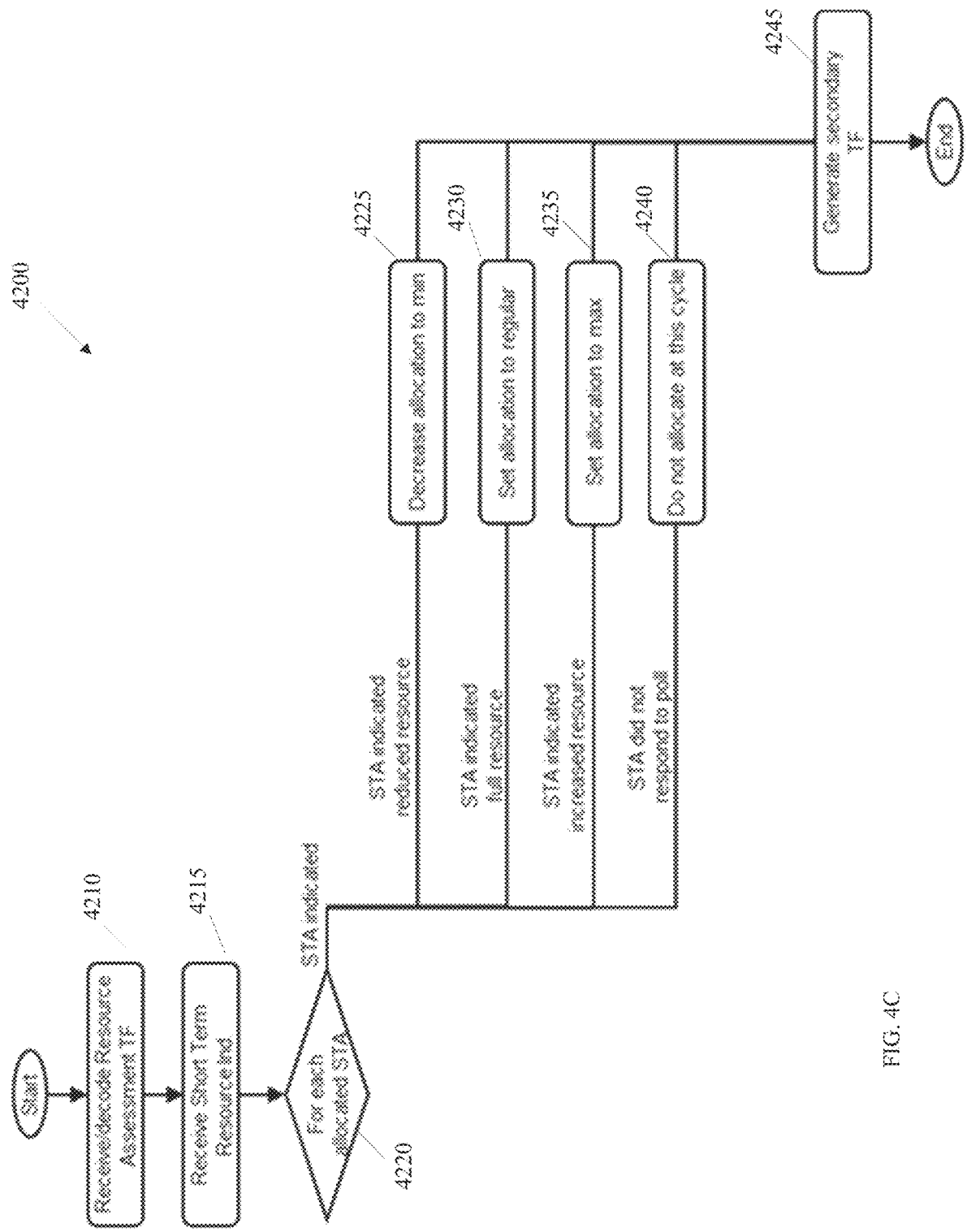
FIG. 4C depicts another embodiment of a flowchart to process short resource assessment indication frames via assessment logic circuitry.

FIG. 4C depicts another embodiment of a flowchart 4200 to implement assessment logic circuitry. At element 4210, assessment logic circuitry of a STA (e.g., the assessment logic circuitry 1220 of the AP MLD 1210 or the assessment logic circuitry 1250 of MLD STA 1230 shown FIG. 1C) may evaluate resource indications from a short term resource assessment frame. In the present embodiment, the short term resource assessment frame may have as few as two bits to provide the resource indication. For example, the HE TB Feedback NDP may advantageously be a PHY frame without a MAC frame, reducing resources required to generate, transmit, receive, and parse a MAC frame from a PHY frame. The HE TB Feedback NDP may include up to four bits encoded in the HE-LTFs of the frame representing a reduced resource, a full resource, an increased resource, and no resource.

At element 4215, the STA may receive and decode the short term resource assessment frame. For instance, the PHY device such as a wireless network interface may receive the short term resource assessment frame via an antenna and a radio. During receipt of the short term resource assessment frame, the PHY device may inform PHY logic circuitry (such as PHY logic circuitry 3092 of FIG. 3 or the baseband processing circuitry 1218 or 1248 shown in FIG. 1C) of the code variations in the HE-LTFs.

At element 4220, the STA may select an action to perform based on the indication of the resources. For instance, if the resources are indicated in the form of two bits, the two bits may include 00, 01, 10, and 11. In the present embodiment, the STA may interpret the bits 00 to mean that the short term resource assessment frame indicates reduced resource and may reduce the resource allocation for the corresponding P2P STA to a minimum allocation 4225 according to a TSPEC. The STA may interpret the bits 01 to mean that the short term resource assessment frame indicates full resource and may provide the normal/regular resource allocation 4230 for the corresponding P2P STA according to a TSPEC. The STA may interpret the bits 10 to mean that the short term resource assessment frame indicates increased resource and may increase the resource allocation 4235 for the corresponding P2P STA to a maximum allocation according to a TSPEC. And the STA may interpret the bits 11 to mean that the short term resource assessment frame indicates no resource or to mean that no short term resource assessment frame was received in response to the trigger frame and may not allocate resources for the corresponding P2P STA. In some embodiments, the lack of receipt of a short term resource assessment frame is interpreted to mean that the STA should not allocate resources 4240 to the corresponding P2P STA.

In the present embodiment, after evaluating the short term resource assessment frames from the group of STAs, the STA may generate a secondary trigger (element 4245). In other embodiments, the MAC resource assessment trigger frame may transmit a request for a second resource assessment for a second data transfer stage. The second data transfer stage may be subsequent to the first data transfer stage. In some embodiments, the STA may schedule a data transmission in the second data transfer stage by transmitting, a SIFS after receipt of the short term resource assessment frames for the first data transfer stage, a short term resource assessment frame indicating expected use of resources during the second data transfer stage.

Figure 4E:
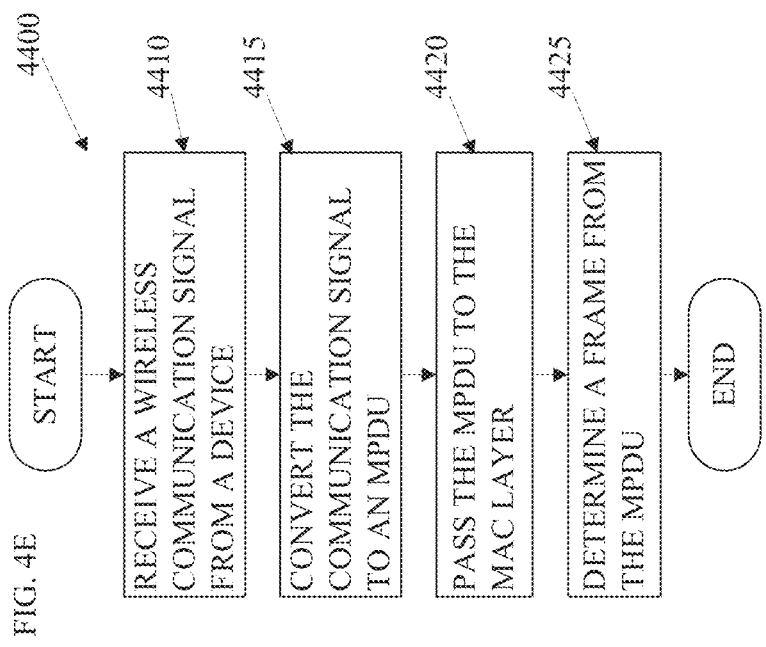
FIGS. 4D-E depict embodiments of flowcharts to generate and transmit frames and receive and interpret frames for communications between wireless communication devices.
Figure 4D:
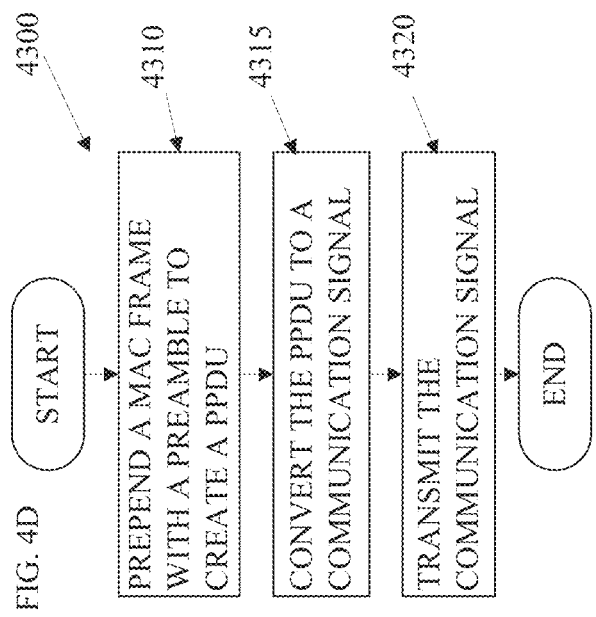

FIGS. 4D-E depict embodiments of flowcharts 4300 and 4410 to transmit, receive, and interpret communications with a frame. Referring to FIG. 4D, the flowchart 4300 may begin with receiving an MU frame from the wireless communications I/F 1216 of the STA 1210 by the wireless communications I/Fs (such as wireless communications I/F 1246 of the STA 1230, STA 1290, STA 1292, and STA 1296 as shown in FIG. 1C. The MAC layer logic circuitry, such as the MAC logic circuitry 3091 in FIG. 1C, of each STA of STA 1230, STA 1290, STA 1292, and STA 1296 may generate a control frame responsive to the MU frame to transmit to the STA 1210 as a control frame to the STA 1210 and may pass the frame as an MAC protocol data unit (MPDU) to a PHY logic circuitry such as the PHY logic circuitry 3092 in FIG. 1C. The PHY logic circuitry may also encode and transform the PPDU into OFDM symbols for transmission to the STA 1210. The PHY logic circuitry may generate a preamble to prepend the PHY service data unit (PSDU) (the MPDU) to form a PHY protocol data unit (PPDU) for transmission (element 4310).

The physical layer device such as the transmitter 3006 in FIG. 3 or the wireless network interfaces 1222 and 1252 in FIG. 1A may convert the PPDU to a communication signal via a radio (element 4315). The transmitter may then transmit the communication signal via the antenna coupled with the radio (element 4320).

In other embodiments, the control frame may be a PHY frame that does not include a MAC frame as a payload. In such embodiments, the MAC layer may pass an instruction to the PHY layer via a MAC layer management entity (MLME) to build and transmit the PHY frame. PHY frames without MAC frames as payloads may be referred to as PHY NDP frames meaning that the PHY frame does not carry a data payload. However, such frames can include data. For instance, the NDP PHY frames include training fields and a signal field to facilitate proper receipt and interpretation of the bits in the signal field. Such fields can include the training bits and/or signal bits encoded via, e.g., a code such as a codebook code, in a pattern that represents bits and can be interpreted by a receiving device. For example, an NDP feedback report response frame may have four long training fields (LTFs) including four long training sequences (LTSs) that are encoded via codebook codes to represent four bits of data (00, 01, 10, and 11).

Referring to FIG. 4E, the flowchart 4410 begins with a receiver of a device such as the receiver 3004 in FIG. 3 receiving a communication signal via one or more antenna (s) such as an antenna element of antenna array 3018 (element 4420). The receiver may convert the communication signal into an MPDU in accordance with the process described in the preamble (element 4425). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, 1024-QAM, or 4096-QAM with a forward error correction (FEC) coding rate (1/2, 2/3, 3/4, or 5/6). And the decoder such as the decoder 3026 decodes the signal information from the demodulator via, e.g., BCC or LDPC, to extract the MPDU and pass or communicate the MPDU to MAC layer logic circuitry such as MAC logic circuitry 3091 (element 4420).

When received at the MAC layer circuitry, the MPDU may be a MAC Service Data Unit (MSDU). The MAC logic circuitry may determine frame field values from the MSDU (MPDU from PHY) (element 4425) such as the control frame fields in the control frame shown in FIG. 2F. For instance, the MAC logic circuitry may determine frame field values such as the type and subtype field values of the control frame. The MAC logic circuitry may determine that the MPDU comprises a control frame so the MAC logic circuitry may generate a frame in response if the sub-band of the channel is clear according to a directional CCA.

Figure 5:
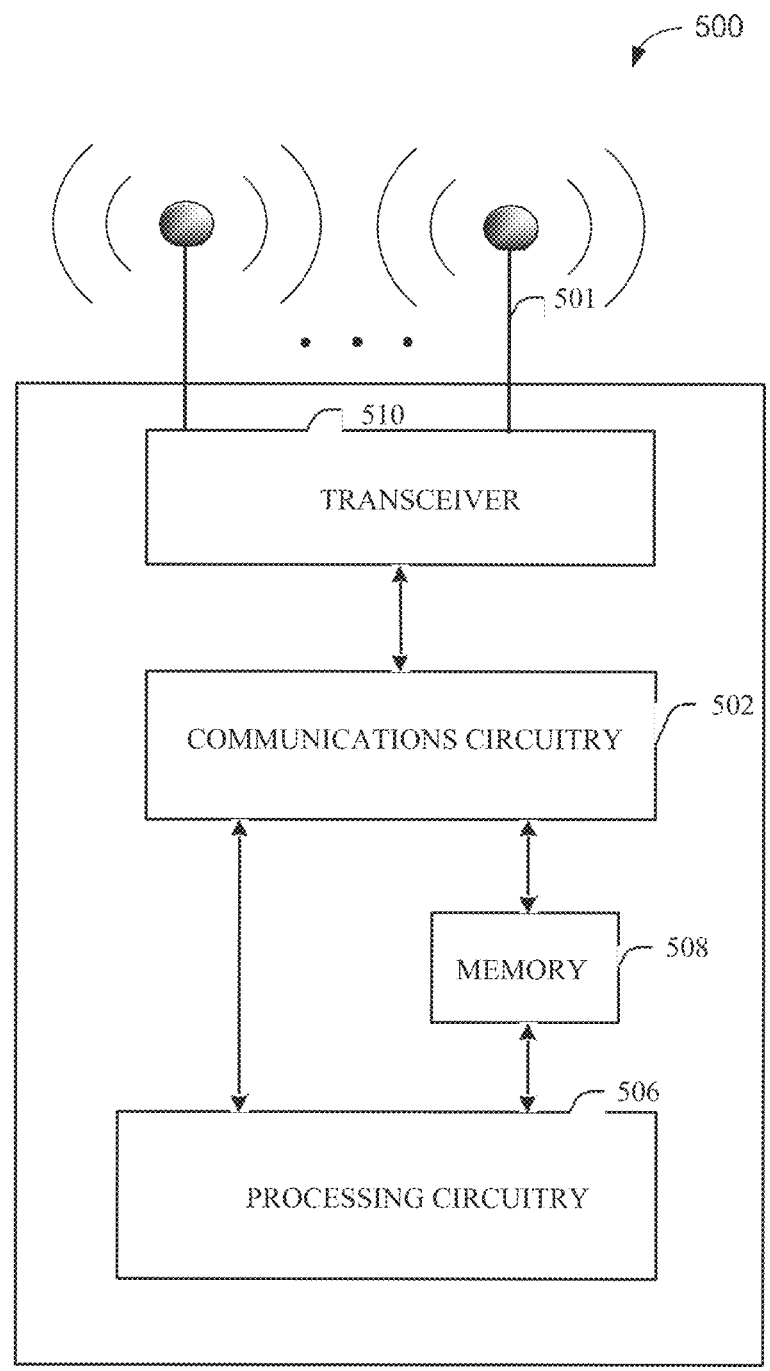
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 1005 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry

506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
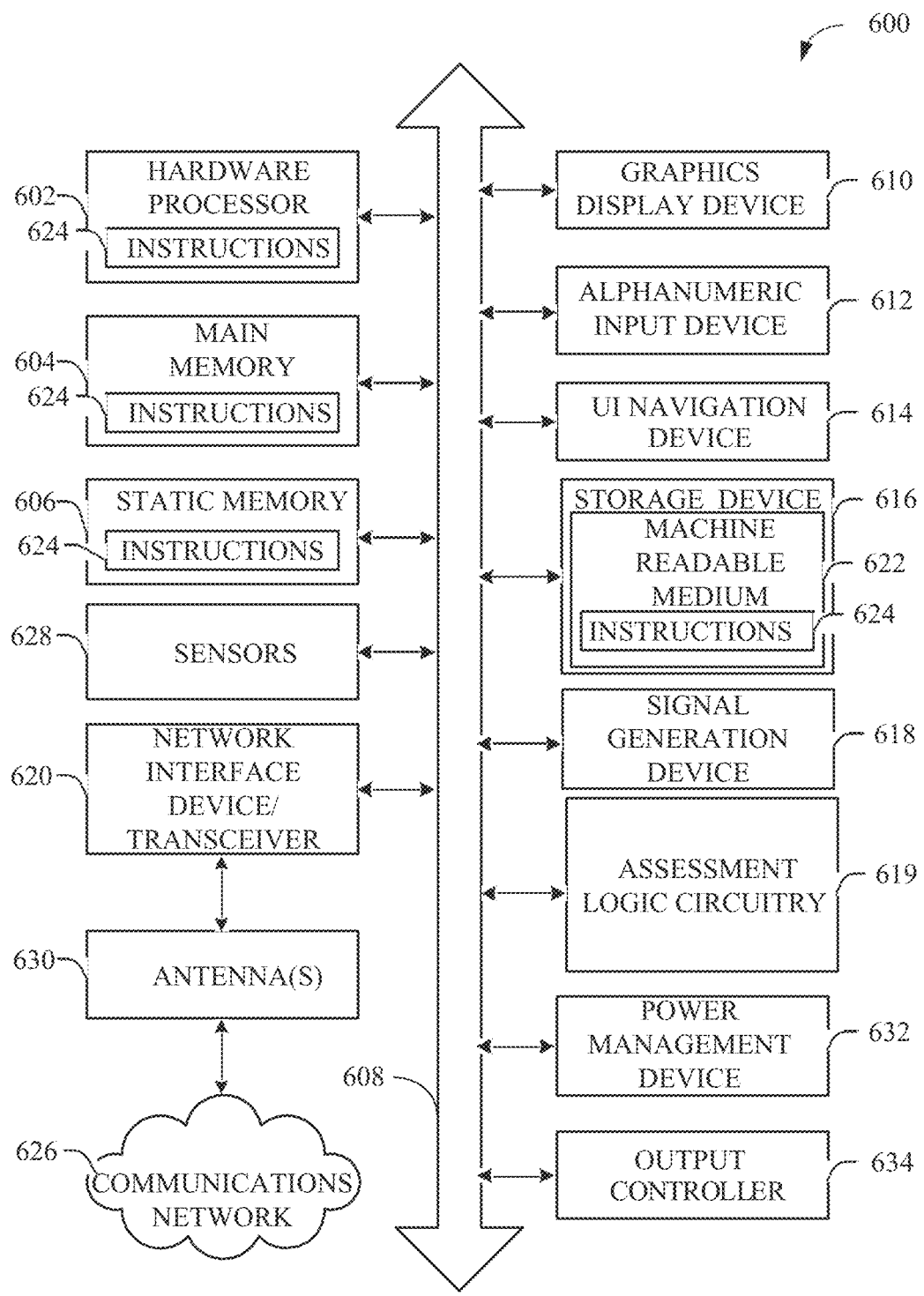
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices, and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an assessment logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the assessment logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The assessment logic circuitry 619 may carry out or perform any of the operations and processes in relation to performing resource assessment by a resource assessment trigger frame transmitted by an AP MLD acting as a channel enabler for a first STA in a 2.4 GHz, 5 GHz, or 6 GHz channel or the like (e.g., flowchart 4000 shown in FIG. 4A, flowchart 4100 shown in FIG. 4B, and flowchart 4200 shown in FIG. 4C) described and shown above. It is understood that the above are only a subset of what the assessment logic circuitry 619 may be configured to perform and that other functions included throughout this disclosure may also be performed by the assessment logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

FIG. 7 illustrates an example of a storage medium 7000 to store assessment logic such as logic to implement the assessment logic circuitry 619 shown in FIG. 6 and/or the other logic discussed herein perform resource assessment for P2P STAs. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

FIG. 8 illustrates an example computing platform 8000 such as the MLD STAs 1210, 1230, 1290, 1292, 1294, 1296, and 1298 in FIG. 1A. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of assessment logic circuitry, advantageously allows operation of stations such as a SoftAP MLD and a P2P MLD in the 6 GHz band using an enabling signal. Use of assessment logic circuitry advantageously provides network administrators in enterprise environment ability to manage and control medium usage of mobile STAs, by opening the enablement for mobile usages in the enterprise environment. Use of assessment logic circuitry, advantageously, via a dedicated enabling signal (resource assessment trigger frame (TF)), allows for managing and limiting the jitter, delay and consistency of the link scheduling. Use of assessment logic circuitry, advantageously manages, via a resource assessment TF used as enabling signal for the wireless medium, all devices which require enablement, prioritizing one over the other, which i.e., provides the ability for the network to manage quality of service (QoS) across multiple mobile to mobile connections. Use of assessment logic circuitry advantageously prevents starvation from low-capacity links. Use of assessment logic circuitry advantageously manages QoS while preventing the Coordinator/Enabler from the need to maintain and manage QoS per Link, which, as a result substantially simplifies the scheduler and memory footprint at the Enabling device. Use of assessment logic circuitry advantageously allocates medium in an efficient way, the polling allows stations like the SoftAP and P2P 2 STA to allocate resources only to STAs that are available for transmission.

Examples of Further Embodiments

The following examples pertain to further embodiments. Specifics in the examples may be used anywhere in one or more embodiments.

Example 1 is an apparatus comprising: a memory; and logic circuitry coupled with the memory to: generate, by an access point (AP) station (STA) of the apparatus, a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA; cause transmission of the MAC resource assessment trigger frame to the first STA and the first group of STAs; and receive one or more short term resource assessment frames from the first group of STAs, the one or more short term resource assessment frames each comprising an indication of resources for a first data transfer during a first data transfer stage, an interframe space after the first TxOP. Example 2 is the apparatus of Example 1, wherein the logic circuitry comprises baseband processing circuitry and further comprising a radio coupled with the baseband processing circuitry, and one or more antennas coupled with the radio to transmit the MAC resource assessment trigger frame. Example 3 is the apparatus of Example 1, wherein each of the indications of resources comprises at least an indication that the corresponding STA of the first group of STAs has data queued and ready to transmit during the first data transfer stage. Example 4 is the apparatus of Example 3, wherein each of the indications of resources comprises at least an indication of an availability to transmit an increased, reduced or full resource for the first data transfer, wherein the increased, reduced or full resource are relative to a peer-to-peer traffic specification (PTP TSPEC). Example 5 is the apparatus of Example 3, an absence of a response from one or more of the STAs in the first group to the MAC resource assessment trigger frame to indicate a lack of readiness to transmit data during the first data transfer stage. Example 6 is the apparatus of Example 1, the MAC resource assessment trigger frame to trigger a transmission of a second trigger frame by the first STA, the second trigger frame to allocate a portion of the first TxOP to the first group of STAs to respond to the MAC resource assessment trigger frame. Example 7 is the apparatus of Example 6, wherein the transmission of the second trigger frame by the first STA is a short interframe space (SIFS) after transmission of the MAC resource assessment trigger frame. Example 8 is the apparatus of Example 1, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 9 is the apparatus of Example 8, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 10 is the apparatus of Example 9, the logic circuitry to further receive one or more short term resource assessment frames from the second group of STAs, wherein each of one or more short term resource assessment frames from the second group of STAs comprises an indication of resources for a second data transfer during a third TxOP. Example 11 is the apparatus of Example 1, the interframe space to comprise a short interframe space (SIFS). Example 12 is the apparatus of Example 1, the logic circuitry to cause transmission of the MAC resource assessment trigger frame on a 2.4 gigahertz (GHz) channel, a 5 GHz channel, or 6 GHz channel. Example 13 is the apparatus of Example 12, the logic circuitry to cause transmission of the MAC resource assessment trigger frame on the 6 GHz channel, wherein the MAC resource assessment trigger frame comprises an enabling signal for access to the 6 GHz channel and the apparatus comprises a channel enabler for the 6 GHz channel, the channel enabler to operate under the control of an automated frequency coordination (AFC) system. Example 14 is the apparatus of Example 1, wherein the short term resource assessment frame comprises a high efficiency single user physical layer protocol data unit (HE SU PPDU) with a MAC frame payload, high efficiency multiple user physical layer protocol data unit (HE MU PPDU) with a MAC frame payload, or high efficiency trigger-based feedback null data unit (HE TB Feedback NDP).

Example 15 is a non-transitory computer-readable medium, comprising instructions, which when executed by a processor, cause the processor to perform operations to: generate, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA; cause transmission of the MAC resource assessment trigger frame to the first STA and the first group of STAs; and receive one or more short term resource assessment frames from the first group of STAs, the one or more short term resource assessment frames each comprising an indication of resources for a first data transfer during a first data transfer stage, an interframe space after the first TxOP. Example 16 is the non-transitory computer-readable medium of Example 15, wherein each of the indications of resources comprises at least an indication that the corresponding STA of the first group of STAs has data queued and ready to transmit during the first data transfer stage. Example 17 is the non-transitory computer-readable medium of Example 16, wherein each of the indications of resources comprises at least an indication of an availability to transmit an increased, reduced or full resource for the first data transfer, wherein the increased, reduced or full resource are relative to a peer-to-peer traffic specification (PTP TSPEC). Example 18 is the non-transitory computer-readable medium of Example 16, an absence of a response from one or more of the STAs in the first group to the MAC resource assessment trigger frame to indicate a lack of readiness to transmit data during the first data transfer stage. Example 19 is the non-transitory computer-readable medium of Example 15, the MAC resource assessment trigger frame to trigger a transmission of a second trigger frame by the first STA, the second trigger frame to allocate a portion of the first TxOP to the first group of STAs to respond to the MAC resource assessment trigger frame. Example 20 is the non-transitory computer-readable medium of Example 19, wherein the transmission of the second trigger frame by the first STA is a short interframe space (SIFS) after transmission of the MAC resource assessment trigger frame. Example 21 is the non-transitory computer-readable medium of Example 15, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 22 is the non-transitory computer-readable medium of Example 21, wherein receipt by the apparatus of the one or more short term resource assessment frames from the first group of STAs comprises receipt of the one or more short term resource assessment frames transmitted from the first group of STAs a short interframe space (SIFS) after transmission of the MAC resource assessment trigger frame. Example 23 is the non-transitory computer-readable medium of Example 22, the operations to further receive one or more short term resource assessment frames from the second group of STAs, wherein each of one or more short term resource assessment frames from the second group of STAs comprises an indication of resources for a second data transfer during a third TxOP. Example 24 is the non-transitory computer-readable medium of Example 15, the interframe space to comprise a short interframe space (SIFS). Example 25 is the non-transitory computer-readable medium of Example 15, the operations to further cause transmission of the MAC resource assessment trigger frame on a 2.4 gigahertz (GHz) channel, a 5 GHz channel, or 6 GHz channel. Example 26 is the non-transitory computer-readable medium of Example 25, the operations further to cause transmission of the MAC resource assessment trigger frame on the 6 GHz channel, wherein the MAC resource assessment trigger frame comprises an enabling signal for access to the 6 GHz channel and the apparatus comprises a channel enabler for the 6 GHz channel, the channel enabler to operate under the control of an automated frequency coordination (AFC) system. Example 27 is the non-transitory computer-readable medium of Example 15, wherein the short term resource assessment frame comprises a high efficiency single user physical layer protocol data unit (HE SU PPDU) with a MAC frame payload, high efficiency multiple user physical layer protocol data unit (HE MU PPDU) with a MAC frame payload, or high efficiency trigger-based feedback null data unit (HE TB Feedback NDP).

Example 28 is a method comprising: generating, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA; causing transmission of the MAC resource assessment trigger frame to the first STA and the first group of STAs; and receiving one or more short term resource assessment frames from the first group of STAs, the one or more short term resource assessment frames each comprising an indication of resources for a first data transfer during a first data transfer stage, an interframe space after the first TxOP. Example 29 is the method of Example 28, wherein each of the indications of resources comprises at least an indication that the corresponding STA of the first group of STAs has data queued and ready to transmit during the first data transfer stage. Example 30 is the method of Example 29, wherein each of the indications of resources comprises at least an indication of an availability to transmit an increased, reduced or full resource for the first data transfer, wherein the increased, reduced or full resource are relative to a peer-to-peer traffic specification (PTP TSPEC). Example 31 is the method of Example 29, an absence of a response from one or more of the STAs in the first group to the MAC resource assessment trigger frame to indicate a lack of readiness to transmit data during the first data transfer stage. Example 32 is the method of Example 28, the MAC resource assessment trigger frame to trigger a transmission of a second trigger frame by the first STA, the second trigger frame to allocate a portion of the first TxOP to the first group of STAs to respond to the MAC resource assessment trigger frame. Example 33 is the method of Example 32, wherein the transmission of the second trigger frame by the first STA is a short interframe space (SIFS) after transmission of the MAC resource assessment trigger frame. Example 34 is the method of Example 28, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 35 is the method of Example 34, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 36 is the method of Example 35, the logic circuitry to further receive one or more short term resource assessment frames from the second group of STAs, wherein each of one or more short term resource assessment frames from the second group of STAs comprises an indication of resources for a second data transfer during a third TxOP. Example 37 is the method of Example 28, the interframe space to comprise a short interframe space (SIFS). Example 38 is the method of Example 28, the logic circuitry to cause transmission of the MAC resource assessment trigger frame on a 2.4 gigahertz (GHz) channel, a 5 GHz channel, or 6 GHz channel. Example 39 is the method of Example 38, the logic circuitry to cause transmission of the MAC resource assessment trigger frame on the 6 GHz channel, wherein the MAC resource assessment trigger frame comprises an enabling signal for access to the 6 GHz channel and the apparatus comprises a channel enabler for the 6 GHz channel, the channel enabler to operate under the control of an automated frequency coordination (AFC) system. Example 40 is the method of Example 28, wherein the short term resource assessment frame comprises a high efficiency single user physical layer protocol data unit (HE SU PPDU) with a MAC frame payload, high efficiency multiple user physical layer protocol data unit (HE MU PPDU) with a MAC frame payload, or high efficiency trigger-based feedback null data unit (HE TB Feedback NDP).

Example 41 is an apparatus comprising: a means for generating, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA; a means for causing transmission of the MAC resource assessment trigger frame to the first STA and the first group of STAs; and a means for receiving one or more short term resource assessment frames from the first group of STAs, the one or more short term resource assessment frames each comprising an indication of resources for a first data transfer during a first data transfer stage, an interframe space after the first TxOP. Example 42 is the apparatus of Example 41, wherein each of the indications of resources comprises at least an indication that the corresponding STA of the first group of STAs has data queued and ready to transmit during the first data transfer stage. Example 43 is the apparatus of Example 42, wherein each of the indications of resources comprises at least an indication of an availability to transmit an increased, reduced or full resource for the first data transfer, wherein the increased, reduced or full resource are relative to a peer-to-peer traffic specification (PTP TSPEC). Example 44 is the apparatus of Example 42, an absence of a response from one or more of the STAs in the first group to the MAC resource assessment trigger frame to indicate a lack of readiness to transmit data during the first data transfer stage. Example 45 is the apparatus of Example 41, the MAC resource assessment trigger frame to trigger a transmission of a second trigger frame by the first STA, the second trigger frame to allocate a portion of the first TxOP to the first group of STAs to respond to the MAC resource assessment trigger frame. Example 46 is the apparatus of Example 45, wherein the transmission of the second trigger frame by the first STA is a short interframe space (SIFS) after transmission of the MAC resource assessment trigger frame. Example 47 is the apparatus of Example 41, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 48 is the apparatus of Example 47, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 49 is the apparatus of Example 48, the logic circuitry to further receive one or more short term resource assessment frames from the second group of STAs, wherein each of one or more short term resource assessment frames from the second group of STAs comprises an indication of resources for a second data transfer during a third TxOP. Example 50 is the apparatus of Example 49, the interframe space to comprise a short interframe space (SIFS). Example 51 is the apparatus of Example 41, the logic circuitry to cause transmission of the MAC resource assessment trigger frame on a 2.4 gigahertz (GHz) channel, a 5 GHz channel, or 6 GHz channel. Example 52 is the apparatus of Example 52, the logic circuitry to cause transmission of the MAC resource assessment trigger frame on the 6 GHz channel, wherein the MAC resource assessment trigger frame comprises an enabling signal for access to the 6 GHz channel and the apparatus comprises a channel enabler for the 6 GHz channel, the channel enabler to operate under the control of an automated frequency coordination (AFC) system. Example 53 is the apparatus of Example 41, wherein the short term resource assessment frame comprises a high efficiency single user physical layer protocol data unit (HE SU PPDU) with a MAC frame payload, high efficiency multiple user physical layer protocol data unit (HE MU PPDU) with a MAC frame payload, or high efficiency trigger-based feedback null data unit (HE TB Feedback NDP).

Example 54 is an apparatus comprising: a memory; and logic circuitry coupled with the memory to: receive a medium access control (MAC) resource assessment trigger frame from a channel enabler, the MAC resource assessment trigger frame to allocate a portion of the first transmission opportunity (TxOP) to the apparatus and to request a first resource assessment from a first group of stations (STAs) for evaluation by the apparatus, the first resource assessment to assess peer-to-peer (P2P) data transfers between the first group of STAs and the apparatus; receive one or more short term resource assessment frames from the first group of STAs, the one or more short term resource assessment frames each comprising an indication of resources for a first data transfer during a first data transfer stage, an interframe space after the first TxOP; and evaluate the one or more short term resource assessment frames from the first group of STAs to determine time resources to allocate to the first group of STAs during a first data transfer stage. Example 55 is the apparatus of Example 54, wherein the logic circuitry comprises baseband processing circuitry and further comprising a radio coupled with the baseband processing circuitry, and one or more antennas coupled with the radio to transmit the MAC resource assessment trigger frame. Example 56 is the apparatus of Example 54, the logic circuitry to further cause transmission of a second trigger frame in response to receipt of the MAC resource assessment trigger frame, the second trigger frame to allocate a portion of the first TxOP to the first group of STAs to respond to the MAC resource assessment trigger frame. Example 57 is the apparatus of Example 56, wherein the transmission of the second trigger frame by the first STA is a short interframe space (SIFS) after transmission of the MAC resource assessment trigger frame. Example 58 is the apparatus of Example 54, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 59 is the apparatus of Example 54, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 60 is the apparatus of Example 59, the logic circuitry to further cause transmission of a short term resource assessment frame in response to receipt of the MAC resource assessment trigger frame, the short term resource assessment frame to assess peer-to-peer (P2P) data transfers between the apparatus and the second STA during a second data transfer stage, the second data transfer stage subsequent to the first data transfer stage. Example 61 is the apparatus of Example 54, the logic circuitry to cause transmission of the MAC resource assessment trigger frame on a 2.4 gigahertz (GHz) channel, a 5 GHz channel, or 6 GHz channel.

Example 62 is a non-transitory computer-readable medium, comprising instructions, which when executed by a processor, cause the processor to perform operations to: receive a medium access control (MAC) resource assessment trigger frame from a channel enabler, the MAC resource assessment trigger frame to allocate a portion of the first transmission opportunity (TxOP) to an apparatus and to request a first resource assessment from a first group of stations (STAs) for evaluation by the apparatus, the first resource assessment to assess peer-to-peer (P2P) data transfers between the first group of STAs and the apparatus; receive one or more short term resource assessment frames from the first group of STAs, the one or more short term resource assessment frames each comprising an indication of resources for a first data transfer during a first data transfer stage, an interframe space after the first TxOP; and evaluate the one or more short term resource assessment frames from the first group of STAs to determine time resources to allocate to the first group of STAs during a first data transfer stage. Example 63 is the non-transitory computer-readable medium of Example 62, the operations to further cause transmission of a second trigger frame in response to receipt of the MAC resource assessment trigger frame, the second trigger frame to allocate a portion of the first TxOP to the first group of STAs to respond to the MAC resource assessment trigger frame. Example 64 is the non-transitory computer-readable medium of Example 63, wherein the transmission of the second trigger frame by the first STA is a short interframe space (SIFS) after transmission of the MAC resource assessment trigger frame. Example 65 is the non-transitory computer-readable medium of Example 62, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 66 is the non-transitory computer-readable medium of Example 62, wherein receipt by the apparatus of the one or more short term resource assessment frames from the first group of STAs comprises receipt of the one or more short term resource assessment frames transmitted from the first group of STAs a short interframe space (SIFS) after transmission of the MAC resource assessment trigger frame. Example 67 is the non-transitory computer-readable medium of Example 62, the operations to further cause transmission of a short term resource assessment frame in response to receipt of the MAC resource assessment trigger frame, the short term resource assessment frame to assess peer-to-peer (P2P) data transfers between the apparatus and the second STA during a second data transfer stage, the second data transfer stage subsequent to the first data transfer stage. Example 68 is the non-transitory computer-readable medium of Example 62, the operations further to cause transmission of the MAC resource assessment trigger frame on a 2.4 gigahertz (GHz) channel, a 5 GHz channel, or 6 GHz channel.

Example 69 is a method comprising: receiving a medium access control (MAC) resource assessment trigger frame from a channel enabler, the MAC resource assessment trigger frame to allocate a portion of the first transmission opportunity (TxOP) to an apparatus and to request a first resource assessment from a first group of stations (STAs) for evaluation by the apparatus, the first resource assessment to assess peer-to-peer (P2P) data transfers between the first group of STAs and the apparatus; receiving one or more short term resource assessment frames from the first group of STAs, the one or more short term resource assessment frames each comprising an indication of resources for a first data transfer during a first data transfer stage, an interframe space after the first TxOP; and evaluating the one or more short term resource assessment frames from the first group of STAs to determine time resources to allocate to the first group of STAs during a first data transfer stage. Example 70 is the method of Example 69, further causing transmission of a second trigger frame in response to receipt of the MAC resource assessment trigger frame, the second trigger frame to allocate a portion of the first TxOP to the first group of STAs to respond to the MAC resource assessment trigger frame. Example 71 is the method of Example 70, wherein the transmission of the second trigger frame by the first STA is a short interframe space (SIFS) after transmission of the MAC resource assessment trigger frame. Example 72 is the method of Example 69, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 73 is the method of Example 69, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 74 is the method of Example 69, further comprising causing transmission of a short term resource assessment frame in response to receipt of the MAC resource assessment trigger frame, the short term resource assessment frame to assess peer-to-peer (P2P) data transfers between the apparatus and the second STA during a second data transfer stage, the second data transfer stage subsequent to the first data transfer stage. Example 75 is the method of Example 69, further comprising causing transmission of the MAC resource assessment trigger frame on a 2.4 gigahertz (GHz) channel, a 5 GHz channel, or 6 GHz channel.

Example 76 is an apparatus comprising: a means for receiving a medium access control (MAC) resource assessment trigger frame from a channel enabler, the MAC resource assessment trigger frame to allocate a portion of the first transmission opportunity (TxOP) to an apparatus and to request a first resource assessment from a first group of stations (STAs) for evaluation by the apparatus, the first resource assessment to assess peer-to-peer (P2P) data transfers between the first group of STAs and the apparatus; a means for receiving one or more short term resource assessment frames from the first group of STAs, the one or more short term resource assessment frames each comprising an indication of resources for a first data transfer during a first data transfer stage, an interframe space after the first TxOP; and a means for evaluating the one or more short term resource assessment frames from the first group of STAs to determine time resources to allocate to the first group of STAs during a first data transfer stage. Example 77 is the apparatus of Example 76, further comprising a means for causing transmission of a second trigger frame in response to receipt of the MAC resource assessment trigger frame, the second trigger frame to allocate a portion of the first TxOP to the first group of STAs to respond to the MAC resource assessment trigger frame. Example 78 is the apparatus of Example 77, wherein the transmission of the second trigger frame by the first STA is a short interframe space (SIFS) after transmission of the MAC resource assessment trigger frame. Example 79 is the apparatus of Example 76, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage. Example 80 is the apparatus of Example 76, wherein receipt by the logic circuitry of the one or more short term resource assessment frames from the first group of STAs comprises receipt of the one or more short term resource assessment frames transmitted from the first group of STAs a short interframe space (SIFS) after transmission of the MAC resource assessment trigger frame. Example 81 is the apparatus of Example 76, further causing transmission of a short term resource assessment frame in response to receipt of the MAC resource assessment trigger frame, the short term resource assessment frame to assess peer-to-peer (P2P) data transfers between the apparatus and the second STA during a second data transfer stage, the second data transfer stage subsequent to the first data transfer stage. Example 82 is the apparatus of Example 76, further comprising a means for causing transmission of the MAC resource assessment trigger frame on a 2.4 gigahertz (GHz) channel, a 5 GHz channel, or 6 GHz channel.

Example 83 is the apparatus of Example 1, wherein the short term resource assessment frame comprises a physical layer null data protocol data unit. Example 84 is the non-transitory computer-readable medium of Example 15, wherein the short term resource assessment frame comprises a physical layer null data protocol data unit. Example 85 is the method of Example 28, wherein the short term resource assessment frame comprises a physical layer null data protocol data unit. Example 85 is the apparatus of Example 41, wherein the short term resource assessment frame comprises a physical layer null data protocol data unit. Example 86 is the apparatus of Example 54, wherein the short term resource assessment frame comprises a physical layer null data protocol data unit. Example 87 is the non-transitory computer-readable medium of Example 62, wherein the short term resource assessment frame comprises a physical layer null data protocol data unit. Example 88 is the method of Example 69, wherein the short term resource assessment frame comprises a physical layer null data protocol data unit. Example 89 is the apparatus of Example 76, wherein the short term resource assessment frame comprises a physical layer null data protocol data unit.

What is claimed is:

1. An apparatus comprising:
   a memory; and
   circuitry coupled with the memory to:
   generate, by an access point (AP) station (STA) of the apparatus, a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA;
   cause transmission of the MAC resource assessment trigger frame to the first STA and the first group of STAs; and
   receive one or more short term resource assessment frames from the first group of STAs, the one or more short term resource assessment frames each comprising an indication of resources for a first data transfer during a first data transfer stage, an interframe space after the first TxOP, wherein each indication of resources comprises at least an indication that the corresponding STA of the first group of STAs has data queued and ready to transmit during the first data transfer stage.

2. The apparatus of claim 1, wherein the circuitry comprises baseband processing circuitry and further comprising a radio coupled with the baseband processing circuitry, and one or more antennas coupled with the radio to transmit the MAC resource assessment trigger frame.

3. The apparatus of claim 1, wherein causing transmission of the MAC resource assessment trigger frame comprises causing transmission on a 2.4 gigahertz (GHz) channel, a 5 GHz channel, or 6 GHz channel.

4. The apparatus of claim 3, wherein each of the indications of resources comprises at least an indication of an availability to transmit an increased, reduced or full resource for the first data transfer, wherein the increased, reduced or full resource are relative to a peer-to-peer traffic specification (PTP TSPEC).

5. The apparatus of claim 3, an absence of a response from one or more of the STAs in the first group to the MAC resource assessment trigger frame to indicate a lack of readiness to transmit data during the first data transfer stage.

6. The apparatus of claim 1, the MAC resource assessment trigger frame to trigger a transmission of a second trigger frame by the first STA, the second trigger frame to allocate a portion of the first TxOP to the first group of STAs to respond to the MAC resource assessment trigger frame.

7. The apparatus of claim 1, wherein the short term resource assessment frame comprises a physical layer null data protocol data unit.

8. The apparatus of claim 1, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage.

9. The apparatus of claim 8, the circuitry to further receive one or more short term resource assessment frames from the second group of STAs, wherein each of one or more short term resource assessment frames from the second group of STAs comprises an indication of resources for a second data transfer during a third TxOP, wherein the MAC resource assessment trigger frame comprises an enabling signal for access to a 6 GHz channel and the apparatus comprises a channel enabler for the 6 GHz channel, the channel enabler to operate under the control of an automated frequency coordination (AFC) system.

10. A non-transitory computer-readable medium, comprising instructions, which when executed by a processor, cause the processor to perform operations to:
    generate, by an access point (AP) station (STA), a medium access control (MAC) resource assessment trigger frame to transmit during a first transmission opportunity (TxOP), the MAC resource assessment trigger frame to allocate a portion of the first TxOP to a first STA and to request a first resource assessment from a first group of STAs for evaluation by the first STA, the first resource assessment to assess peer-to-peer (P2P) data transfers between the first group of STAs and the first STA;
    cause transmission of the MAC resource assessment trigger frame to the first STA and the first group of STAs, the MAC resource assessment trigger frame to trigger a transmission of a second trigger frame by the first STA, the second trigger frame to allocate a portion of the first TxOP to the first group of STAs to respond to the MAC resource assessment trigger frame; and
    receive one or more short term resource assessment frames from the first group of STAs, the one or more short term resource assessment frames each comprising an indication of resources for a first data transfer during a first data transfer stage, an interframe space after the first TxOP.

11. The non-transitory computer-readable medium of claim 10, wherein each of the indications of resources comprises at least an indication that the corresponding STA of the first group of STAs has data queued and ready to transmit during the first data transfer stage.

12. The non-transitory computer-readable medium of claim 11, wherein each of the indications of resources comprises at least an indication of an availability to transmit an increased, reduced or full resource for the first data transfer, wherein the increased, reduced or full resource are relative to a peer-to-peer traffic specification (PTP TSPEC).

13. The non-transitory computer-readable medium of claim 11, wherein causing transmission of the MAC resource assessment trigger frame comprises causing transmission on a 2.4 gigahertz (GHz) channel, a 5 GHz channel, or 6 GHz channel.

14. The non-transitory computer-readable medium of claim 13, the MAC resource assessment trigger frame to further request a second resource assessment from a second group of STAs for evaluation by a second STA, the second group of STAs including the first STA, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage.

15. The non-transitory computer-readable medium of claim 10, wherein the short term resource assessment frame comprises a high efficiency single user physical layer protocol data unit (HE SU PPDU) with a MAC frame payload, high efficiency multiple user physical layer protocol data unit (HE MU PPDU) with a MAC frame payload, or high efficiency trigger-based feedback null data unit (HE TB Feedback NDP).

16. An apparatus comprising:
a memory; and
circuitry coupled with the memory to:
receive a medium access control (MAC) resource assessment trigger frame from a channel enabler, the MAC resource assessment trigger frame to allocate a portion of a first transmission opportunity (TxOP) to the apparatus and to request a first resource assessment from a first group of stations (STAs) for evaluation by the apparatus, the first resource assessment to assess peer-to-peer (P2P) data transfers between the first group of STAs and the apparatus;
cause transmission of a second trigger frame in response to receipt of the MAC resource assessment trigger frame, the second trigger frame to allocate a portion of the first TxOP to the first group of STAs to respond to the MAC resource assessment trigger frame;
receive one or more short term resource assessment frames from the first group of STAs, the one or more short term resource assessment frames each comprising an indication of resources for a first data transfer during a first data transfer stage, an interframe space after the first TxOP; and
evaluate the one or more short term resource assessment frames from the first group of STAs to determine time resources to allocate to the first group of STAs during the first data transfer stage.

17. The apparatus of claim 16, wherein the circuitry comprises baseband processing circuitry and further comprising a radio coupled with the baseband processing circuitry, and one or more antennas coupled with the radio to transmit the MAC resource assessment trigger frame.

18. The apparatus of claim 16, the circuitry further to cause transmission of the MAC resource assessment trigger frame on a 2.4 gigahertz (GHz) channel, a 5 GHz channel, or 6 GHz channel.

19. The apparatus of claim 18, wherein the transmission of the second trigger frame by the apparatus is a short interframe space (SIFS) after transmission of the MAC resource assessment trigger frame.

20. The apparatus of claim 16, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to the first data transfer stage.

21. The apparatus of claim 16, the circuitry to further cause transmission of a short term resource assessment frame in response to receipt of the MAC resource assessment trigger frame, the short term resource assessment frame to assess peer-to-peer (P2P) data transfers between the apparatus and a second STA during a second data transfer stage, the second data transfer stage subsequent to the first data transfer stage.

22. A non-transitory computer-readable medium, comprising instructions, which when executed by a processor, cause the processor to perform operations to:
receive a medium access control (MAC) resource assessment trigger frame from a channel enabler, the MAC resource assessment trigger frame to allocate a portion of the first transmission opportunity (TxOP) to an apparatus and to request a first resource assessment from a first group of stations (STAs) for evaluation by the apparatus, the first resource assessment to assess peer-to-peer (P2P) data transfers between the first group of STAs and the apparatus, the MAC resource assessment trigger frame to further request a second resource assessment from a second group of STAs for evaluation by a second STA, the second group of STAs including the apparatus, the second STA to be one of STAs in the first group of STAs, the second resource assessment to assess peer-to-peer (P2P) data transfers between the second group of STAs and the second STA during a second data transfer stage, the second data transfer stage subsequent to a first data transfer stage;
receive one or more short term resource assessment frames from the first group of STAs, the one or more short term resource assessment frames each comprising an indication of resources for a first data transfer during the first data transfer stage, an interframe space after the first TxOP; and
evaluate the one or more short term resource assessment frames from the first group of STAs to determine time resources to allocate to the first group of STAs during the first data transfer stage.

23. The non-transitory computer-readable medium of claim 22, the operations to further cause transmission of a second trigger frame in response to receipt of the MAC resource assessment trigger frame, the second trigger frame to allocate a portion of the first TxOP to the first group of STAs to respond to the MAC resource assessment trigger frame.

24. The non-transitory computer-readable medium of claim 22, the operations to further cause transmission of a short term resource assessment frame in response to receipt of the MAC resource assessment trigger frame, the short term resource assessment frame to assess peer-to-peer (P2P) data transfers between the apparatus and the second STA during the second data transfer stage, the second data transfer stage subsequent to the first data transfer stage.

25. The non-transitory computer-readable medium of claim 22, the operations further to cause transmission of the MAC resource assessment trigger frame on a 2.4 gigahertz (GHz) channel, a 5 GHz channel, or 6 GHz channel.

* * * * *